3,031,375
17β-(HALO-HYDROXY-PROPANOYL)-
PREGNENE DERIVATIVES
Eugene J. Agnello, Lyme, and Gerald D. Laubach, Niantic, Conn., assignors to Chas. Pfizer & Co., Inc., New York, N.Y., a corporation of Delaware
No Drawing. Filed Jan. 22, 1960, Ser. No. 3,998
3 Claims. (Cl. 167—65)

This application is concerned with new and useful steroid compounds. More particularly it is concerned with certain steroids having adrenocortical activity characterized by having unique chemical features in the carbon atom side chain at the 17β-position. It is concerned also with a method of making these valuable compounds and with pharmaceutical compositions containing them together with pharmaceutically acceptable excipients.

This application is a continuation-in-part of previously filed patent applications Serial Nos. 740,595, now abandoned; 764,270, 764,271, now abandoned, 800,991 and 800,996, filed June 9, 1958, September 30, 1958, September 30, 1958, March 23, 1959, and March 23, 1959, respectively. It should be noted that the system of nomenclature used herein is different from that employed in the previous applications. It is believed that the present system is in more strict conformance with preferred practice.

The essence of this invention is the discovery that adrenocortically active steroids heretofore characterized by the presence of an α-hydroxy acetyl group at the 17β-position are also therapeutically useful when the α-hydroxy acetyl group is replaced with a halo-substituted hydroxylated propanoyl group such as α-hydroxy-β-halo propanoyl and α-halo-β-hydroxy propanoyl.

Adrenocortically active steriods now constitute a well defined class in the art, and include therapeutically active agents having a wide range of applications in the medical field. Cortisone, hydrocortisone, prednisone, prednisolone, 2-methyl-prednisolone, 6-methyl-prednisolone, 16α-hydroxy-prednisolone, 9α-fluoro-prednisolone, 16α-methyl-prednisolone, 16-β-methyl-prednisolone and others have been found to be useful as systemic and topical anti-inflammatory agents and for other medical uses. They have for example, been used in the treatment of rheumatic diseases and allergies. They are pregnene derivatives having a cyclopentanopolyhydrophenanthrene nucleus. They generally have a double bond at the 4-position, a keto group at the 3-position and an oxygen function at the 11-position. Certain 9,11-dihalopregnene derivatives have adrenocortical activity. The compounds of this invention belong to the class of adrenocortically active steroids.

The compounds of this invention may be represented by the formula:

R—M wherein R is a cyclopentanopolyhydrophenanthrene nucleus having adrenocortical activity when substituted at the 17β-position with an α-hydroxy acetyl group and M is selected from the group consisting of α-hydroxy-β-halo and α-halo-β-hydroxy groups substituted at the 17β-position of the cyclopentanopolyhydrophenanthrene nucleus. More particularly, the side chain at the 17β-position of the valuable steroids of this invention may be defined as halohydrin substituted propanoyl groups including within the definition those halohydrin moieties in which the hydroxyl group is acylated with an acyl group containing only carbon, hydrogen and oxygen up to a total of ten carbon atoms.

The preferred compounds within the purview of this invention include those having the formulas:

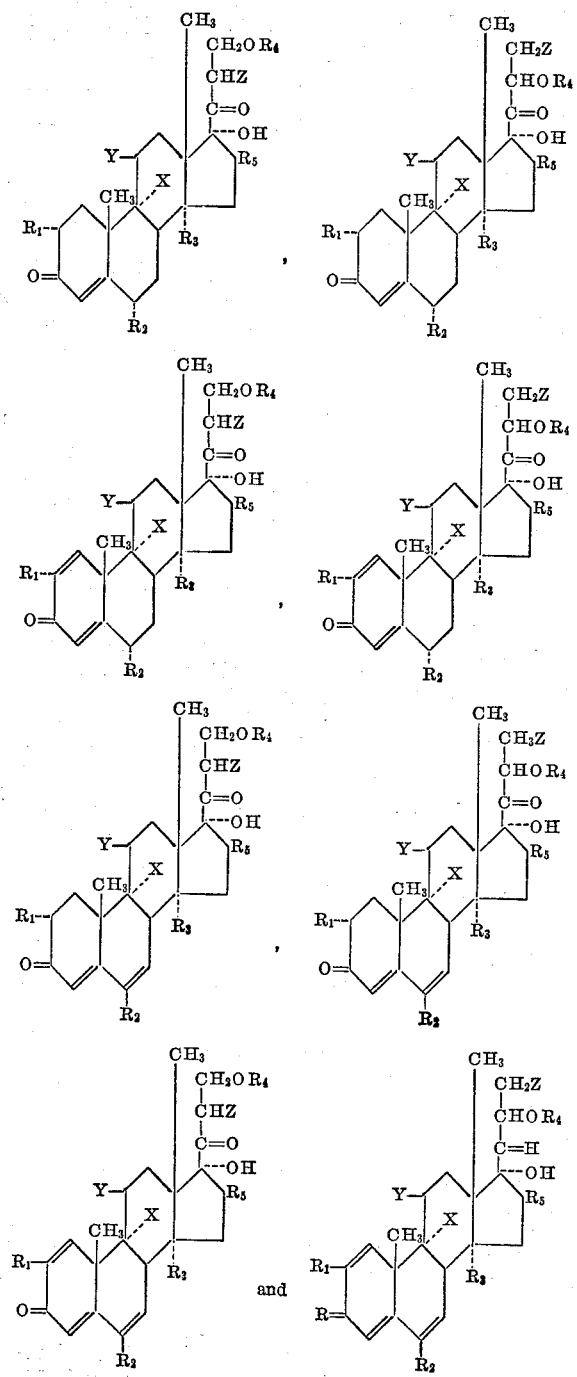

In the above structures, $R_1$ is hydrogen or methyl; $R_2$ is hydrogen, fluorine, chlorine or methyl; $R_3$ is hydrogen or hydroxyl; $R_4$ is hydrogen or acyl; $R_5$ is

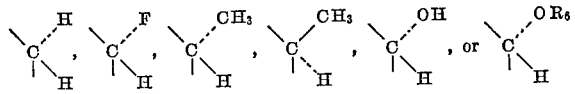

wherein $R_6$ is an acyl group. An acyl group wherever located is derived from mono- or dicarboxylic acids containing up to ten carbon atoms and contains only carbon, hydrogen and oxygen. The water solubility of the compounds derived from dicarboxylic acids is enhanced by conversion to alkali metal or alkaline earth metal salts by reaction with a suitable base such as sodium carbonate or calcium hydroxide. These salts are included within the purview of this invention. In the above structures, X is hydrogen, α-halogen, α-methoxy or α-ethoxy, Y is keto or β-hydroxyl and Z is fluorine, chlorine, bromine or iodine. In the preferred compounds represented above, the carbon atom at the 16-position is always substituted with at least one hydrogen and at least three of $R_1$, $R_2$, $R_3$, and the second substituent on the number 16 carbon atom will always be hydrogen.

Also included within the preferred compounds of this invention are further compounds in which hydroxyl groups at the 16- and 17-positions are derivatized with aldehydes or ketones containing from two to nine carbon atoms to form cyclic acetals or ketals known generically as acetonides, in this case 16α,17α-acetonides. The acetonide moiety of preferred compounds of this invention contain from two to nine carbon atoms.

The acetonides within the purview of this invention are prepared by procedures well known to those skilled in the art. They may be prepared, for example, by the procedure described by Woodward et al. in the Journal of the American Chemical Society, 74, p. 4241 (1952). In this procedure, the steroid compound is taken up in the carbonyl compound, for example, acetone, methyl ethyl ketone or di-n-butyl ketone which has been dried over a suitable drying agent such as anhydrous potassium carbonate. Anhydrous copper sulfate is added and the mixture agitated for from about 24 to about 48 hours. The mixture is then filtered and the desired product recovered, for example, by removal of the solvent in vacuo. Other methods of forming acetals and ketals are also applicable. For example, the steroid may be taken up in the liquid aldehyde or ketone and refluxed in the presence of a catalytic amount of a mineral acid such as concentrated hydrochloric acid, for from about 1 to about 10 minutes. The desired product is precipitated by the addition of water.

It will be noted from the above formulas that the presence of a new asymmetric center at C–21 gives rise to the possibility of two epimers. Both forms are active so that for most therapeutic purposes it is immaterial whether a mixture or a pure form is used. If desired, pure forms may be obtained by chromatography using chloroform as the mobile phase and formamide as the stationary phase. The side chain esters are similarly separated using a 1:3 mixture of chloroform and benzene as the mobile phase and formamide as the stationary phase.

Starting compounds which are useful in the preparation of the valuable therapeutic agents of this invention include those having the formula:

R—Z wherein R has the same meaning as above and Z, which is located at the 17β-position is a 2,3-epoxido-propionyl group.

Starting compounds for the preparation of the adrenocortically active steroids of this invention are prepared in accordance with the following reaction sequence which also shows the preparation of the compounds themselves. The sequence shows only the preparation of 21-chloromethyl-Δ⁴-pregnene-11β,17α,21-triol-3,20-dione and 21-chloro-21-hydroxymethyl-Δ¹,⁴-pregnadiene-11β,17α-diol-3,20-dione, but it is equally applicable to the preparation of other compounds within the scope of the invention.

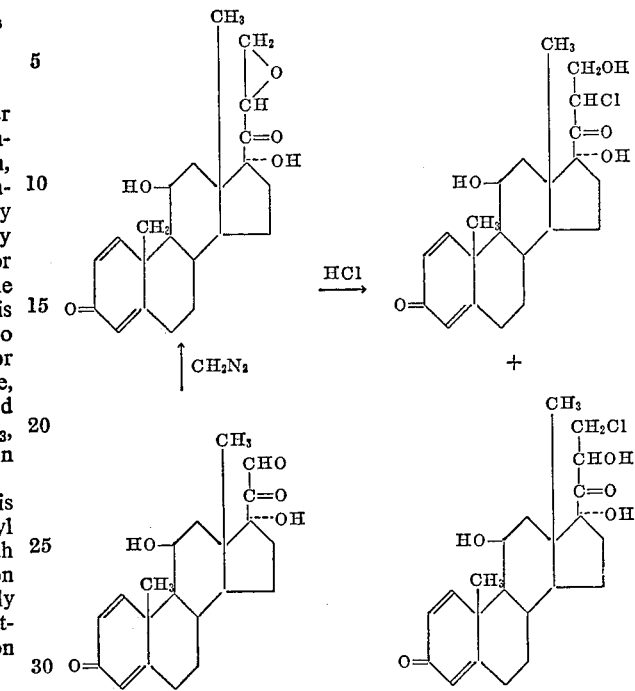

This sequence of reactions and the intermediate products are described and claimed in copending and concurrently filed patent application Serial No. 3,999.

The requisite aldehydes are prepared from the corresponding 21-hydroxylated compounds by reaction with cupric acetate as described in U.S. Patent 2,773,078, issued December 4, 1956.

The epoxide is prepared by reaction of the aldehyde with diazomethane in a reaction inert solvent at a temperature of from about 0° to about 25° C. for a period of from about 1 to about 24 hours.

Reaction of the starting compound with a halogen acid, preferably anhydrous, in a reaction inert organic solvent produces the desired halohydrins of this invention. Solvents useful for carrying out the process of this invention include lower halogenated aliphatic organic solvents such as methylene or ethylene dichloride, chloroform, and carbon tetrachloride as well as lower aliphatic oxygenated organic solvents including acids and alcohols such as methanol, ethanol, acetic acid and propionic acid.

Although some reaction product is formed using even small amounts of halogen acid, for best yields at least an equimolar proportion of reactants should be used, and it is preferred to use from about a two to about a three molar excess of acid. As much as a ten or more molar excess can be used, however.

The reaction is carried out at a temperature of from about −15° C. to about 30° C., the preferred temperature conditions being from about −15° C. to about 15° C.

The duration of the reaction will depend upon the temperature. At relatively high temperatures the reaction is substantially complete in fifteen minutes, but at a lower temperature two to four hours may be required. In the preferred temperature range, about one to about three hours generally gives excellent yields.

The product may be isolated by simple evaporation of the solvent, preferably in vacuo and purified by recrystallization from a suitable solvent or solvent mixture such as ethyl acetate-chloroform. If an organic acid is used as the solvent, it is best to dilute the acid by the addition of water and to neutralize the reaction mixture with an alkaline reagent such as sodium or potassium carbonate. The mixture is then extracted with a suitable solvent, for example, a lower aliphatic halogenated hydrocarbon such as chloroform or carbon tetrachloride. The product is isolated from the organic solvent by evaporation, preferably after the solvent is washed with water and dried. The product may be purified by trituration with a suitable solvent, for example, 2:1 ether-ethyl acetate and recrystallized as described above. The product so obtained is the $\alpha$-hydroxy-$\beta$-halo propanoyl compound.

The $\alpha$-halo-$\beta$-hydroxy propanoyl compound is isolated from the mother liquor, that is, the filtrate from the recrystallization by chromatographic procedures. One procedure which is especially suitable is to pass the solution over a column of magnesium silicate, for example, Florisil such as that described in United States Patent No. 2,393,625. The ratio of adsorbent to steroid should be about 30:1 and the column is eluted first with ethylene chloride, then with chloroform and subsequently with chloroform-methanol mixture containing increasing increments of methanol of from about 5% to about 50%. The product is isolated from the chloroform-methanl eluates by evaporation of the solvent in vacuo.

It may be desirable to analyze the steroid content of each chloroform-methanol fraction in order to determine its steroid content. This can readily be accomplished using well known paper chromatographic techniques with a chloroform-formamide system.

It will be noted by reference to the formulas representing the compounds of this invention that it is specifically intended to include within the purview of the instant invention a 16$\alpha$-hydroxylated compound in which the hydroxyl group is esterified with an acyl hydrocarbon group containing up to ten carbon atoms. The term "acyl hydrocarbon" includes acyl hydrocarbon groups containing only carbon, hydrogen and oxygen derived from monocarboxylic or dicarboxylic acids. In the event that the acyl hydrocarbon group chosen is one derived from a dicarboxylic acid, it is often advantageous to treat an adrenocortically active compound with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

The 16$\alpha$-hydroxyl group may be readily esterified by standard methods. It is well known that the 16$\alpha$-hydroxyl group can be esterified without concomitant esterification of an 11$\beta$-hydroxyl group even though both hydroxyl groups are secondary hydroxyl groups. Although Fischer esterification and transesterification procedures may be employed, in general, it is preferred to form the esters by treatment with an acylating agent such as acyl halide or anhydride in the presence of a tertiary amine base such as pyridine or dimethylaniline.

Free alcohols are prepared from the corresponding esters by gentle hydrolysis, for example, with diluted hydrogen chloride in aqueous methanol or potassium carbonate in aqueous methanol.

As used in this application, the term "halo-substituted hydroxylated propanol group" means an $\alpha$ or $\beta$-hydroxylated propanoyl group in which the $\alpha$ or $\beta$ carbon atom not carrying a hydroxyl group is substituted with a fluorine, chlorine, bromine or iodine atom, including those in which the hydroxyl group is acylated with an acyl group containing only carbon, hydrogen and oxygen up to a total of ten carbon atoms.

The biologically active compounds of this invention may be administered alone or in combination with acceptable pharmaceutical carriers, the choice of which is determined by the preferred route of administration, the solubility of the compound and standard pharmectuical practice. In general, the dosage of these compounds is of approximately the same order of magnitude as the dosage of hydrocortisone, and these compounds are useful to treat the types of pathological conditions often treated with hydrocortisone. Because of their great adrenocortical activity, it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavoured may also be used. To apply these therapeutic agents topically, they may be prepared in the form of ointments and salves in suitable bases especially non-aqueous petroleum type bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

Apart from their therapeutic value, certain of the compounds of the instant invention are also useful as intermediates in the preparation of other adrenocortically active steroids. Copending and concurrently filed patent application Serial No. 4,000, for example, describes the conversion of the bromine and iodine substituted compounds of the invention to 17$\beta$-($\alpha$-hydroxy-propanoyl)- and 17$\beta$-($\beta$-hydroxyl-propanoyl)-substituted steroids such as 21-methyl-$\Delta^{1,4}$-pregnadiene-11$\beta$,17$\alpha$,21-triol-3,20-dione which are very valuable as adrenocortical agents. This conversion is effected by reduction using, for example, Raney nickel, preferably in excess in a reaction inert organic solvent such as methanol at a temperature of from about 0° C. to about 30° C. for from about 5 minutes to about 24 hours.

Copending and concurrently filed patent application Serial Number 4,000, describes the conversion of the chlorine substituted compounds of this invention to 17$\beta$-pyruvoyl substituted steroids such as 21-methyl-$\Delta^4$-pregnene-11$\beta$-17$\alpha$-diol-3,20,21-trione which are valuable for their adrenocortical activity. The conversion is effected using, in preferred practice, an excess of bismuth trioxide in a lower oxygenated aliphatic solvent such as acetic acid at a temperature of from about 50° C. to about 60° C. for a period of from about 2½ to about 4 hours.

The following examples are given solely for the purpose of illustration and are not to be construed as limitations of this invention, many apparent variations of which are possible without departing from the spirit or scope thereof.

EXAMPLE I

*21-Chloromethyl-$\Delta^{1,4}$-Pregnadiene-11$\beta$,17$\alpha$,21-Triol-3,20-Dione*

A solution containing 500 mg. of 17$\beta$-(2,3-epoxidopropionyl)-$\Delta^{1,4}$-androstadiene-11$\beta$,17$\alpha$-diol-3-one in 50 ml. of alcohol free chloroform was prepared and a solution containing a 500% molar excess of anhydrous hydrogen chloride in 50 ml. of glacial acetic acid was added. The solution was maintained at 25° C. for one and one-half hours and 125 ml. of chloroform was added together with 75 ml. of water. The excess acid was neutralized by the addition of solid potassium carbonate and the organic layer separated. It was washed with water, dried over anhydrous sodium sulfate, filtered and the filtrate concentrated to dryness in vacuo. The residue was triturated with 2:1 ether-ethyl acetate, filtered and the precipitate was recrystallized from ethyl acetate-chloroform to give the desired product melting at 199–200° C. (d.), $[\alpha]_D = +66°$ (dioxane)

$$\lambda_{max.}^{alc.} = 243 \, m\mu (14,350)$$

*Analysis.*—Calcd. for $C_{22}H_{29}O_5Cl$: C, 64.6; H, 7.15; Cl, 8.7. Found: C, 64.8; H, 7.2; Cl, 8.1.

21-chloro-21-hydroxymethyl-$\Delta^{1,4}$-pregnadiene-11$\beta$,17$\alpha$-diol-3,20-dione was recovered from the recrystallization solvent by concentrating the solvent to dryness and dissolving the residue in ethylene chloride. The ethylene chloride solution was passed over a column of Florisil containing sufficient adsorbent so that the ration of adsorbent to steroid is 30:1. The column is washed with a fresh portion of ethylene chloride and then with chloroform. The chloroform is subsequently eluted with 25 ml. portions of chloroform-methanol containing 5%, 10%, 15%, 25%, 35% and 50% respectively of methanol. The product is isolated by combining the chloroform-methanol eluates, evaporating to dryness and recrystallizing the residue from ethyl acetate-chloroform.

EXAMPLE II

*21-Iodomethyl-$\Delta^4$-Pregnene-11$\beta$,17$\alpha$,21-Triol-3,20-Dione*

A solution containing 500 mg. of 17$\beta$-(2,3-epoxido-propionyl)-$\Delta^4$-androstene-11$\beta$,17$\alpha$-diol-3-one in 50 ml. of dioxane was prepared and a solution containing an equimolar portion of hydrogen iodide in 50 ml. of dioxane was added. The solution was maintained at $-30°$ C. for 3 hours. It was evaporated to dryness and the residue triturated with 2:1 ether-ethyl acetate. The product was recovered by filtration and recrystallized from ethyl acetate-chloroform.

The corresponding 21-hydroxymethyl compound was isolated using a chromatographic procedure described in Example I.

EXAMPLE III

*21-Bromomethyl-$\Delta^4$-Pregnene-11$\beta$,17$\alpha$,21-Triol-3,20-Dione*

A solution containing 500 mg. of 17$\beta$-(2,3-epoxido-propionyl)-$\Delta^4$-androstene-11$\beta$,17$\alpha$-diol-3-one in 50 ml. of ethylene chloride was prepared and an ethylene chloride solution containing a 1000% molar excess of anhydrous hydrogen bromide was added. The solution was maintained at 25° C. for 2½ hours. The product was recovered by filtration and recrystallized from ethyl acetate-chloroform.

The corresponding 21-hydroxymethyl compound was isolated using a chromatographic procedure described in Example 1.

EXAMPLE IV

*21-Fluoromethyl-$\Delta^4$-Pregnene-11$\beta$,17$\alpha$,21-Triol-3,20-Dione*

A solution containing 500 mg. of 17$\beta$-(2,3-epoxido-propionyl)-$\Delta^4$-androstene-11$\beta$,17$\alpha$-diol-3-one in 50 ml. of carbon tetrachloride was prepared and a carbon tetrachloride solution containing a 500% molar excess of anhydrous hydrogen fluoride was added. The solution was maintained at $-30°$ C. for 15 minutes. The product was recovered by filtration and recrystallized from ethyl acetate-chloroform.

The corresponding 21-hydroxymethyl compound was isolated using a chromatographic procedure described in Example I.

EXAMPLE V

*21-Chloromethyl-$\Delta^4$-Pregnene-11$\beta$,17$\alpha$,21-Triol-3,20-Dione*

The solution containing 500 mg. of 17$\beta$-(2,3-epoxido-propionyl)-$\Delta^4$-androstene-11$\beta$,17$\alpha$-diol-3-one in 50 ml. of ethanol was prepared and an ethanol solution containing a 300% molar excess of anhydrous hydrogen chloride was added. The solution was maintained at 5° C. for 3 hours. The product was recovered by filtration and recrystallized from ethyl acetate-chloroform.

The corresponding 21-hydroxymethyl compound was isolated using a chromatographic procedure described in Example I.

The corresponding brom, iodo and fluoro compounds were prepared using the procedures of the preceding examples.

EXAMPLE VI

*21-Chloromethyl-$\Delta^{1,4,6}$-Pregnatriene-11$\beta$,17$\alpha$,21-Triol-3,20-Dione*

A solution containing 500 mg. of 17$\beta$-(2,3-epoxido-propionyl)-$\Delta^{1,4,6}$-androstatriene-11$\beta$,17$\alpha$-diol-3-one in 50 ml. of chloroform was prepared and a chloroform solution containing a 250% molar excess of anhydrous hydrogen chloride was added. The solution was maintained at 15° C. for 3 hours. The product was recovered by filtration and recrystallized from ethyl acetate-chloroform.

The corresponding 21-hydroxymethyl compound was isolated using a chromatographic procedure described in Example I.

EXAMPLE VII

*9$\alpha$-Fluoro-21-Chloromethyl-$\Delta^4$-Pregnene-11$\beta$,17$\alpha$,21-Triol-3,20-Dione*

A solution containing 9$\alpha$-fluoro-17$\beta$-(2,3-epoxido-propionyl)-$\Delta^4$-androstene-11$\beta$,17$\alpha$-diol-3-one in 50 ml. of chloroform was prepared and a solution containing 250% molar excess of anhydrous hydrogen chloride in chloroform was added. The solution was maintained at 15° C. for 3 hours. The product was recovered by filtration and recrystallized from ethyl acetate-chloroform.

The corresponding 21-hydroxymethyl compound was isolated using a chromatographic procedure described in Example I.

The corresponding fluoro, bromo and iodo compounds were prepared using the procedures in Examples II, III and IV.

EXAMPLE VIII

*9$\alpha$-Fluoro-21-Chloromethyl-$\Delta^{1,4}$-Pregnadiene-11$\beta$,17$\alpha$,21-Triol-3,20-Dione*

A solution containing 500 mg. of 9$\alpha$-fluoro-17$\beta$-(2,3-epoxido-propionyl) - $\Delta^{1,4}$ - androstadiene-11$\beta$,17$\alpha$-diole-3-one in 50 ml. of chloroform was prepared and a solution containing a 250% molar excess of anhydrous hydrogen chloride in chloroform was added. The solution was maintained at 15° C. for 3 hours. The product was recovered by filtration and recrystallized from ethyl acetate-chloroform: M.P. 174–176° C. (d.), $[\alpha]_D = +87°$ (dioxane).

$$\lambda_{max.}^{alc.} = 239 \text{ m}\mu(15,300)$$

*Analysis.*—Calcd. for $C_{22}H_{28}O_5FCl$: C, 61.89; H, 6.61; Cl, 7.57. Found: C, 61.99; H, 6.94; Cl, 7.63.

The corresponding 21-hydroxymethyl compound was isolated using a chromatographic procedure described in Example I.

The corresponding fluoro, bromo and iodo compounds were prepared using the procedures of the preceding examples.

EXAMPLE IX

*9$\alpha$-Fluoro-21-chloromethyl-$\Delta^{1,4,6}$-Pregnatriene-11$\beta$,17$\alpha$,21-Triol-3,20-Dione*

A solution containing 500 mg. of 9$\alpha$-fluoro-17$\beta$-(2,3-epoxido-propionyl) - $\Delta^{1,4,6}$-androstatriene-11$\beta$,17$\alpha$-diol-3-one in 50 ml. of chloroform was prepared and a solution containing a 250% molar excess of anhydrous hydrogen chloride in chloroform was added. The solution was maintained at 15° C. for 3 hours. The product was recovered by filtration and recrystallized from ethyl acetate-chloroform.

The corresponding 21-hydroxymethyl compound was isolated using a chromatographic procedure described in Example I.

The corresponding fluoro, bromo and iodo compounds were prepared using the procedure of the preceding examples.

EXAMPLE X

*9$\alpha$-Bromo-21-Chloromethyl-$\Delta^4$-Pregnene-11$\beta$,17$\alpha$,21-Triol-3,20-Dione*

A solution containing 500 mg. of 9$\alpha$-bromo-17$\beta$-(2,3-epoxido-propionyl)-$\Delta^4$-androstene - 11$\beta$,17$\alpha$-diol-3-one in 50 ml. of dioxane was prepared and a solution containing a 250% molar excess of anhydrous hydrogen chloride in dioxane was added. The solution was maintained at 15°

C. for 3 hours. The product was recovered by filtration and recrystallized from ethyl acetate-chloroform.

The corresponding 21-hydroxymethyl compound was isolated using a chromatographic procedure described in Example I.

The corresponding fluoro, bromo and iodo compounds were prepared using the procedure of the preceding examples.

EXAMPLE XI

16α-Methyl-21-Chloromethyl-Δ⁴-Pregnene 11β,17α,21-Triol-3,20-Dione

A solution containing 500 mg. of 16α-methyl-17β-(2,3-epoxide-propionyl)-Δ⁴-androstene-11β,17α-diol-3-one in 5 ml. of alcohol free chloroform was prepared and a solution containing a 500% molar excess of anhydrous hydrogen chloride in 50 ml. of glacial acetic acid was added. The solution was maintained at 25° C. for one and one-half hours and 125 ml. of chloroform was added together with 75 ml. of water. The excess acid was neutralized by the addition of solid potassium carbonate and the organic layer separated. It was washed with water, dried over anhydrous sodium sulfate, filtered and the filtrate concentrated to dryness in vacuo. The residue was triturated with 2:1 other-ethyl acetate, filtered and the precipitate recrystallized from ethyl acetate chloroform to give the desired product.

The corresponding 21-hydroxymethyl compounds were similarly prepared.

16α-methyl-21-chloro-21-hydroxymethyl - Δ⁴-pregnene-11β,17α-diol-3-one was recovered from the recrystallization solvent by concentrating the solvent to dryness and dissolving the residue in ethylene chloride. The ethylene chloride solution was passed over a column of Florisil containing sufficient adsorbent so that the ratio of adsorbent to steroid was 30:1. The column is washed with a fresh portion of ethylene chloride and then with chloroform. The chloroform is subsequently eluted with 25 ml. portions of chloroform-methanol containing 5%, 10%, 15%, 25%, 35% and 50% respectively of methanol. The product is isolated by combining the chloroform-methanol eluates, evaporating to dryness and recrystallizing the residue from ethyl acetate-chloroform.

EXAMPLE XII

16β-Methyl-21-Chloromethyl-Δ⁴-Pregnene-11β,17α,21-Triol-3,20-Dione

A solution containing 500 mg. of 16β-methyl-17β-(2,3-epoxido-propionyl)-Δ⁴-androstene-11β,17α-diol-3-one in 5 ml. of alcohol free chloroform was prepared and a solution containing a 500% molar excess of anhydrous hydrogen chloride in 50 ml. of glacial acetic acid was added. The solution was maintained at 25° C. for one and one-half hours and 125 ml. of chloroform was added together with 75 ml. of water. The excess acid was neutralized by the addition of solid potassium carbonate and the organic layer separated. It was washed with water, dried over anhydrous sodium sulfate, filtered and the filtrate concentrated to dryness in vacuo. The residue was triturated with 2:1 ether-ethyl acetate, filtered and the precipitate recrystallized from ethyl acetate-chloroform to give the desired product.

The corresponding 21-hydroxymethyl compounds were similarly prepared.

16β-methyl-21-chloro-21-hydroxymethyl - Δ⁴-pregnene-11β,17α-diol-3-one was recovered from the recrystallization solvent by concentrating the solvent to dryness and dissolving the residue in ethylene chloride. The ethylene chloride solution was passed over a column of Florisil containing sufficient adsorbent so that the ration of adsorbent to steroid is 30:. The column is washed with a fresh portion of ethylene chloride and then with chloroform. The chloroform is subsequently eluted with 25 ml. portion of chloroform-methanol containing 5%, 10%, 15%, 25%, 35% and 50% respectively of methanol. The product is isolated by combining the chloroform-methanol elutes, evaporating to dryness and recrystallizing the residue from ethyl acetate-chloroform.

EXAMPLE XIII

6α-Fluoro-21-Chloromethyl-Δ⁴-Pregnene-11β,17α,21-Triol-3,20-Dione

A solution containing 500 mg. of 6α-fluoro-17β-(2,3-epoxido-propionyl)-Δ⁴-androstene-11β,17α-diol-3-one in 5 ml. of alcohol free chloroform was prepared and a solution containing a 500% molar excess of anhydrous hydrogen chloride in 50 ml. of glacial acetic acid was added. The solution was maintained at 25° C. for one and one-half hours and 125 ml. of chloroform was added together with 75 ml. of water. The excess acid was neutralized by the addition of solid potassium carbonate and the organic layer separated. It was washed with water, dried over anhydrous sodium sulfate, filtered and the filtrate concentrated to dryness in vacuo. The residue was triturated with 2:1 ether-ethyl acetate, filtered and the precipitate recrystallized from ethyl acetate-chloroform to give the desired product.

The corresponding 21-hydroxymethyl compounds were similarly prepared.

6α - fluoro - 21 - chloro - 21 - hydroxymethyl - Δ⁴ - pregnene-11β,17α-diol-3,20-dione was recovered from the recrystallization solvent by concentrating the solvent to dryness and dissolving the residue in ethylene chloride. The ethylene chloride solution was passed over a column of Florisil containing sufficient adsorbent so that the ratio of adsorbent to steroid is 30:1. The column is washed with a fresh portion of ethylene chloride and then with chloroform. The chloroform is subsequently eluted with 25 ml. portions of chloroform-methanol containing 5%, 10%, 15%, 25%, 35% and 50% respectively of methanol. The product is isolated by combining the chloroform-methanol eluates, evaporating to dryness and recrystallizing the residue from ethyl acetate-chloroform.

EXAMPLE XIV

16-Methylene-21-Chloromethyl-Δ⁴-Pregnene-11β,17α,21-Triol-3,20-Dione

A solution containing 500 mg. of 16-methylene-17β-(2,3 - epoxido - propionyl) - Δ⁴ - androstene - 11β,17α-diol-3-one in 5 ml. of alcohol free chloroform was prepared and a solution containing a 500% molar excess of anhydrous hydrogen chloride in 50 ml. of glacial acetic acid was added. The solution was maintained at 25° C. for one and one-half hours and 125 ml. of chloroform was added together with 75 ml. of water. The excess acid was neutralized by the addition of solid potassium carbonate and the organic layer separated. It was washed with water, dried over anhydrous sodium sulfate, filtered and the filtrate concentrated to dryness in vacuo. The residue was triturated 2:1 ether-ethyl acetate, filtered and the precipitate recrystallized from ethyl acetate-chloroform to give the desired product.

The corresponding 21-hydroxymethyl compounds were similarly prepared.

16 - methylene - 21 - chloro - 21 - hydroxymethyl - Δ⁴-pregnene-11β,17α-diol-3,20-dione was recovered from the recrystallization solvent by concentrating the solvent to dryness and dissolving the residue in ethylene chloride. The ethylene chloride solution was passed over a column of Florisil containing sufficient adsorbent so that the ratio of adsorbent to steroid is 30:1. The column is washed with a fresh portion of ethylene chloride and then with chloroform. The chloroform is subsequently eluted with 25 ml. portions of chloroform-methanol containing 5%, 10%, 15%, 25%, 35% and 50% respectively of methanol. The product is isolated by combining the chloroform-methanol eluates, evaporating to dryness and recrystallizing the residue from ethyl acetate-chloroform.

EXAMPLE XV

*16α-Fluoro-21-Chloromethyl-Δ⁴-Pregnene-11β,17α,21-Triol-3,20-Dione*

A solution containing 500 mg. of 16α-fluoro-17β-(2,3-epoxido-propionyl)-Δ⁴-androstene-11β,17α-diol-3-one in 5 ml. of alcohol free chloroform was prepared and a solution containing a 500% molar excess of anhydrous hydrogen chloride in 50 ml. of glacial acetic acid was added. The solution was maintained at 25° C. for one and one-half hours and 125 ml. of chloroform was added together with 75 ml. of water. The excess acid was neutralized by the addition of solid potassium carbonate and the organic layer separated. It was washed with water, dried over anhydrous sodium sulfate, filtered and the filtrate concentrated to dryness in vacuo. The residue was triturated with 2:1 ether-ethyl acetate, filtered and the precipitate recrystallized from ethyl acetate-chloroform to give the desired product.

The corresponding 21-hydroxymethyl compounds were similarly prepared.

16α - fluoro - 21 - chloro - 21 - hydroxymethyl - Δ⁴-pregnene-11β,17α-diol-3,20-dione was recovered from the recrystallization solvent by concentrating the solvent to dryness and dissolving the residue in ethylene chloride. The ethylene chloride solution was passed over a column of Florisil containing sufficient adsorbent so that the ratio of adsorbent to steroid is 30:1. The column is washed with a fresh portion of ethylene chloride and then with chloroform. The chloroform is subsequently eluted with 25 ml. portion of chloroform-methanol containing 5%, 10%, 15%, 25%, 35% and 50% respectively of methanol. The product is isolated by combining the chloroform-methanol eluates, evaporating to dryness and recrystallizing the residue from ethyl acetate-chloroform.

The following list is illustrative of the compounds within the purview of this invention which are prepared using the process of this invention. The list is given to avoid unnecessary repetition of experimental details which are fully illustrated in the foregoing examples. Although only 21-chloromethyl compounds are listed it should be understood that corresponding 21-halomethyl compounds as well as the 21-hydroxymethyl compounds of this invention are similarly prepared.

9α-chloro-21-chloromethyl-Δ⁴-pregnene-11β,17α,21-triol-3,20-dione
9α-iodo-21-chloromethyl-Δ⁴-pregnene-11β,17α,21-triol-3,20-dione
9α-bromo-21-chloromethyl-Δ⁴-pregnene-11β,17α,21-triol-3,20-dione
9α-ethoxy-21-chloromethyl-Δ⁴-pregnene-11β,17α,21-triol-3,20-dione 21-chloromethyl-Δ⁴-pregnene-17α,21-diol-3,11,20-trione
9α-fluoro-21-chloromethyl-Δ⁴-pregnene-17α,21-diol-3,11,20-trione
9α-chloro-21-chloromethyl-Δ⁴-pregnene-17α,21-diol-3,11,20-trione
9α-bromo-21-chloromethyl-Δ⁴-pregnene-17α,21-diol-3,11,20-trione
9α-iodo-21-chloromethyl-Δ⁴-pregnene-17α,21-diol-3,11,20-trione
9α-methoxy-21-chloromethyl-Δ⁴-pregnene-17α,21-diol-3,11,20-trione
9α-ethoxy-21-chloromethyl-Δ⁴-pregnene-17α,21-diol-3,11,20-trione 2α-methyl-21-chloromethyl-Δ⁴-pregnene-11β,17α,21-ol-3,20-dione
9α-fluoro-2α-methyl-21-chloromethyl-Δ⁴-pregnene-11β,17α,21-ol-3,20-dione
9α-chloro-2α-methyl-21-chloromethyl-Δ⁴-pregnene-11β,17α,21-ol-3,20-dione
9α-bromo-2α-methyl-21-chloromethyl-Δ⁴-pregnene-11β,17α,21-ol-3,20-dione
9α-iodo-2α-methyl-21-chloromethyl-Δ⁴-pregnene-11β,17α,21-ol-3,20-dione
9α-methoxy-2α-methyl-21-chloromethyl-Δ⁴-pregnene-11β,17α,21-ol-3,20-dione
9α-ethoxy-2α-methyl-21-chloromethyl-Δ⁴-pregnene-11β,17α,21-ol-3,20-dione 2α-methyl-21-chloromethyl-Δ⁴-pregnene-17α,21-diol-3,11,20-trione
9α-fluoro-2α-methyl-21-chloromethyl-Δ⁴-pregnene-17α,21-diol-3,11,20-trione
9α-chloro-2α-methyl-21-chloromethyl-Δ⁴-pregnene-17α,21-diol-3,11,20-trione
9α-bromo-2α-methyl-21-chloromethyl-Δ⁴-pregnene-17α,21-diol-3,11,20-trione
9α-iodo-2α-methyl-21-chloromethyl-Δ⁴-pregnene-17α,21-diol-3,11,20-trione
9α-methoxy-2α-methyl-21-chloromethyl-Δ⁴-pregnene-17α,21-diol-3,11,20-trione
9α-ethoxy-2α-methyl-21-chloromethyl-Δ⁴-pregnene-17α,21-diol-3,11,20-trione 6α-methyl-21-chloromethyl-Δ⁴-pregnene-11β,17α,21-ol-3,20-dione
9α-fluoro-6α-methyl-21-chloromethyl-Δ⁴-pregnene-11β,17α,21-ol-3,20-dione
9α-chloro-6α-methyl-21-chloromethyl-Δ⁴-pregnene-11β,17α,21-ol-3,20-dione
9α-iodo-6α-methyl-21-chloromethyl-Δ⁴-pregnene-11β,17α,21-ol-3,20-dione
9α-bromo-6α-methyl-21-chloromethyl-Δ⁴-pregnene-11β,17α,21-ol-3,20-dione
9α-methoxy-6α-methyl-21-chloromethyl-Δ⁴-pregnene-11β,17α,21-ol-3,20-dione
9α-ethoxy-6α-methyl-21-chloromethyl-Δ⁴-pregnene-11β,17α,21-ol-3,20-dione 6α-methyl-21-chloromethyl-Δ⁴-pregnene-17α,21-diol-3,11,20-trione
9α-fluoro-6α-methyl-21-chloromethyl-Δ⁴-pregnene-17α,21-diol-3,11,20-trione
9α-chloro-6α-methyl-21-chloromethyl-Δ⁴-pregnene-17α,21-diol-3,11,20-trione
9α-bromo-6α-methyl-21-chloromethyl-Δ⁴-pregnene-17α,21-diol-3,11,20-trione
9α-iodo-6α-methyl-21-chloromethyl-Δ⁴-pregnene-17α,21-diol-3,11,20-trione
9α-methoxy-6α-methyl-21-chloromethyl-Δ⁴-pregnene-17α,21-diol-3,11,20-trione
9α-ethoxy-6α-methyl-21-chloromethyl-Δ⁴-pregnene-17α,21-diol-3,11,20-trione 21-chloromethyl-Δ⁴-pregnene-11β,14α,17α,21-tetrol-3,20-dione
9α-fluoro-21-chloromethyl-Δ⁴-pregnene-11β,14α,17α,21-tetrol-3,20-dione
9α-chloro-21-chloromethyl-Δ⁴-pregnene-11β,14α,17α,21-tetrol-3,20-dione
9α-bromo-21-chloromethyl-Δ⁴-pregnene-11β,14α,17α,21-tetrol-3,20-dione
9α-iodo-21-chloromethyl-Δ⁴-pregnene-11β,14α,17α,21-tetrol-3,20-dione
9α-methoxy-21-chloromethyl-Δ⁴-pregnene-11β,14α,17α,21-tetrol-3,20-dione
9α-ethoxy-21-chloromethyl-Δ⁴-pregnene-11β,14α,17α,21-tetrol-3,20-dione 21-chloromethyl-Δ⁴-pregnene-14α,17α,21-triol-3,11,20-trione
9α-fluoro-21-chloromethyl-Δ⁴-pregnene-14α,17α,21-triol-3,11,20-trione
9α-chloro-21-chloromethyl-Δ⁴-pregnene-14α,17α,21-triol-3,11,20-trione
9α-bomo-21-chloromethyl-Δ⁴-pregnene-14α,17α,21-triol-3,11,20-trione
9α-iodo-21-chloromethyl-Δ⁴-pregnene-14α,17α,21-triol-3,11,20-trione 9α-methoxy-21-chloromethyl-Δ⁴-pregnene-14α,17α,21-triol-3,11,20-trione
9α-ethoxy-21-chloromethyl-Δ⁴-pregnene-14α,17α,21-triol-3,11,20-trione 21-chloromethyl-Δ⁴-pregnene-11β,16α,17α,21-tetrol-3,20-dione
9α-fluoro-21-chloromethyl-Δ⁴-pregnene-11β,16α,17α,21-tetrol-3,20-dione
9α-chloro-21-chloromethyl-Δ⁴-pregnene-11β,16α,17α,21-tetrol-3,20-dione
9α-bromo-21-chloromethyl-Δ⁴-pregnene-11β,16α,17α,21-tetrol-3,20-dione
9α-iodo-21-chloromethyl-Δ⁴-pregnene-11β,16α,17α,21-tetrol-3,20-dione
9α-methoxy-21-chloromethyl-Δ⁴-pregnene-11β,16α,17α,21-tetrol-3,20-dione
9α-ethoxy-21-chloromethyl-Δ⁴-pregnene-11β,16α,17α,21-tetrol-3,20-dione 21-chloromethyl-Δ⁴-pregnene-16α,17α,21-triol-3,11,20-trione
9α-fluoro-21-chloromethyl-Δ⁴-pregnene-16α,17α,21-triol-3,11,20-trione
9α-chloro-21-chloromethyl-Δ⁴-pregnene-16α,17α,21-triol-3,11,20-trione
9α-bromo-21-chloromethyl-Δ⁴-pregnene-16α,17α,21-triol-3,11,20-trione
9α-iodo-21-chloromethyl-Δ⁴-pregnene-16α,17α,21-triol-3,11,20-trione
9α-methoxy-21-chloromethyl-Δ⁴-pregnene-16α,17α,21-triol-3,11,20-trione
9α-ethoxy-21-chloromethyl-Δ⁴-pregnene-16α,17α,21-triol-3,11,20-trione 9α-chloro-21-chloromethyl-Δ¹,⁴-pregnadiene-11β,17α,21-triol-3,20-dione
9α-iodo-21-chloromethyl-Δ¹,⁴-pregnadiene-11β,17α,21-triol-3,20-dione
9α-bromo-21-chloromethyl-Δ¹,⁴-pregnadiene-11β,17α,21-triol-3,20-dione
9α-methoxy-21-chloromethyl-Δ¹,⁴-pregnadiene-11β,17α,21-triol-3,20-dione
9α-ethoxy-21-chloromethyl-Δ¹,⁴-pregnadiene-11β,17α,21-triol-3,20-dione 21-chloromethyl-Δ¹,⁴-pregnadiene-17α,21-diol-3,11,20-trione
9α-fluoro-21-chloromethyl-Δ¹,⁴-pregnadiene-17α,21-diol-3,11,20-trione
9α-chloro-21-chloromethyl-Δ¹,⁴-pregnadiene-17α,21-diol-3,11,20-trione
9α-bromo-21-chloromethyl-Δ¹,⁴-pregnadiene-17α,21-diol-3,11,20-trione
9α-iodo-21-chloromethyl-Δ¹,⁴-pregnadiene-17α,21-diol-3,11,20-trione
9α-methoxy-21-chloromethyl-Δ¹,⁴-pregnadiene-17α,21-diol-3,11,20-trione
9α-ethoxy-21-chloromethyl-Δ¹,⁴-pregnadiene-17α,21-diol-3,11,20-trione 2-methyl-21-chloromethyl-Δ¹,⁴-pregnadiene-11β,17α-triol-3,20-dione
9α-fluoro-2-methyl-21-chloromethyl-Δ¹,⁴-pregnadiene-11β,17α,21-triol-3,20-dione
9α-chloro-2-methyl-21-chloromethyl-Δ¹,⁴-pregnadiene-11β,17α,21-triol-3,20-dione
9α-bromo-2-methyl-21-chloromethyl-Δ¹,⁴-pregnadiene-11β,17α,21-triol-3,20-dione
9α-iodo-2-methyl-21-chloromethyl-Δ¹,⁴-pregnadiene-11β-17α,21-triol-3,20-dione
9α-methoxy-2-methyl-21-chloromethyl-Δ¹,⁴-pregnadiene-11β,17α,21-triol-3,20-dione
9α-ethoxy-2-methyl-21-chloromethyl-Δ¹,⁴-pregnadiene-11β,17α,21-triol-3,20-dione 2-methyl-21-chloromethyl-Δ¹,⁴-pregnadiene-17α,21-diol-3,11,20-trione
9α-fluoro-2-methyl-21-chloromethyl-Δ¹,⁴-pregnadiene-17α,21-diol-3,11,20-trione
9α-chloro-2-methyl-21-chloromethyl-Δ¹,⁴-pregnadiene-17α,21-diol-3,11,20-trione
9α-bromo-2-methyl-21-chloromethyl-Δ¹,⁴-pregnadiene-17α,21-diol-3,11,20-trione
9α-iodo-2-methyl-21-chloromethyl-Δ¹,⁴-pregnadiene-17α,21-diol-3,11,20-trione
9α-methoxy-2-methyl-21-chloromethyl-Δ¹,⁴-pregnadiene-17α,21-diol-3,11,20-trione
9α-ethoxy-2-methyl-21-chloromethyl-Δ¹,⁴-pregnadiene-17α,21-diol-3,11,20-trione 6α-methyl-21-chloromethyl-Δ¹,⁴-pregnadiene-11β,17α,21-triol-3,20-dione
9α-fluoro-6α-methyl-21-chloromethyl-Δ¹,⁴-pregnadiene-11β,17α,21-triol-3,20-dione
9α-chloro-6α-methyl-21-chloromethyl-Δ¹,⁴-pregnadiene-11β,17α,21-triol-3,20-dione
9α-iodo-6α-methyl-21-chloromethyl-Δ¹,⁴-pregnadiene-11β,17α,21-triol-3,20-dione
9α-bromo-6α-methyl-21-chloromethyl-Δ¹,⁴-pregnadiene-11β,17α,21-triol-3,20-dione
9α-methoxy-6α-methyl-21-chloromethyl-Δ¹,⁴-pregnadiene-11β,17α,21-triol-3,20-dione
9α-ethoxy-6α-ethoxy-21-chloromethyl-Δ¹,⁴-pregnadiene-11β,17α,21-triol-3,20-dione 6α-methyl-21-chloromethyl-Δ¹,⁴-pregnadiene-17α,21-diol-3,11,20-trione
9α-fluoro-6α-methyl-21-chloromethyl-Δ¹,⁴-pregnadiene-17α,21-diol-3,11,20-trione
9α-chloro-6α-methyl-21-chloromethyl-Δ¹,⁴-pregnadiene-17α,21-diol-3,11,20-trione
9α-bromo-6α-methyl-21-chloromethyl-Δ¹,⁴-pregnadiene-17α,21-diol-3,11,20-trione
9α-iodo-6α-methyl-21-chloromethyl-Δ¹,⁴-pregnadiene-17α,21-diol-3,11,20-trione
9α-methoxy-6α-methyl-21-chloromethyl-Δ¹,⁴-pregnadiene-17α,21-diol-3,11,20-trione
9α-ethoxy-6α-methyl-21-chloromethyl-Δ¹,⁴-pregnadiene-17α,21-diol-3,11,20-trione 21-chloromethyl-Δ¹,⁴-pregnadiene-11β,14α,17α,21-tetrol-3,20-dione
9α-fluoro-21-chloromethyl-Δ¹,⁴-pregnadiene-11β,14α,17α,21-tetrol-3,20-dione
9α-chloro-21-chloromethyl-Δ¹,⁴-pregnadiene-11β,14α,17α,21-tetrol-3,20-dione
9α-bromo-21-chloromethyl-Δ¹,⁴-pregnadiene-11β,14α,17α,21-tetrol-3,20-dione
9α-iodo-21-chloromethyl-Δ¹,⁴-pregnadiene-11β,14α,17α,21-tetrol-3,20-dione
9α-methoxy-21-chloromethyl-Δ¹,⁴-pregnadiene-11β,14α,17α,21-tetrol-3,20-dione
9α-ethoxy-21-chloromethyl-Δ¹,⁴-pregnadiene-11β,14α,17α,21-tetrol-3,20-dione 21-chloromethyl-Δ¹,⁴-pregnadiene-14α,17α,21-triol-3,11,20-trione
9α-fluoro-21-chloromethyl-Δ¹,⁴-pregnadiene-14α,17α,21-triol-3,11,20-trione
9α-chloro-21-chloromethyl-Δ¹,⁴-pregnadiene-14α,17α,21-triol-3,11,20-trione
9α-bromo-21-chloromethyl-Δ¹,⁴-pregnadiene-14α,17α,21-triol-3,11,20-trione
9α-iodo-21-chloromethyl-Δ¹,⁴-pregnadiene-14α,17α,21-triol-3,11,20-trione
9α-methoxy-21-chloromethyl-Δ¹,⁴-pregnadiene-14α,17α,21-triol-3,11,20-trione
9α-ethoxy-21-chloromethyl-Δ¹,⁴-pregnadiene-14α,17α,21-triol-3,11,20-trione 21-chloromethyl-Δ¹,⁴-pregnadiene-11β,16α,17α,21-tetrol-3,20-dione
9α-fluoro-21-chloromethyl-Δ¹,⁴-pregnadiene-11β,16α,17α,21-tetrol-3,20-dione
9α-chloro-21-chloromethyl-Δ¹,⁴-pregnadiene-11β,16α,17α,21-tetrol-3,20-dione 9α-bromo-21-chloromethyl-Δ$^{1,4}$-pregnadiene-11β,16α,17α,21-tetrol-3,20-dione
9α-iodo-21-chloromethyl-Δ$^{1,4}$-pregnadiene-11β,16α,17α,21-tetrol-3,20-dione
9α-methoxy-21-chloromethyl-Δ$^{1,4}$-pregnadiene-11β,16α,17α,21-tetrol-3,20-dione
9α-ethoxy-21-chloromethyl-Δ$^{1,4}$-pregnadiene-11β,16α,17α,21-tetrol-3,20-dione
21-chloromethyl-Δ$^{1,4}$-pregnadiene-16α,17α,21-triol-3,11,20-trione
9α-fluoro-21-chloromethyl-Δ$^{1,4}$-pregnadiene-16α,17α,21-triol-3,11,20-trione
9α-chloro-21-chloromethyl-Δ$^{1,4}$-pregnadiene-16α,17α,21-triol-3,11,20-trione
9α-bromo-21-chloromethyl-Δ$^{1,4}$-pregnadiene-16α,17α,21-triol-3,11,20-trione
9α-iodo-21-chloromethyl-Δ$^{1,4}$-pregnadiene-16α,17α,21-triol-3,11,20-trione
9α-methoxy-21-chloromethyl-Δ$^{1,4}$-pregnadiene-16α,17α,21-triol-3,11,20-trione
9α-ethoxy-21-chloromethyl-Δ$^{1,4}$-pregnadiene-16α,17α,21-triol-3,11,20-trione
21-chloromethyl-Δ$^{4,6}$-pregnadiene-11β,17α,21-triol-3,20-dione
9α-fluoro-21-chloromethyl-Δ$^{4,6}$-pregnadiene-11β,17α,21-triol-3,20-dione
9α-chloro-21-chloromethyl-Δ$^{4,6}$-pregnadiene-11β,17α,21-triol-3,20-dione
9α-iodo-21-chloromethyl-Δ$^{4,6}$-pregnadiene-11β,17α,21-triol-3,20-dione
9α-bromo-21-chloromethyl-Δ$^{4,6}$-pregnadiene-11β,17α,21-triol-3,20-dione
9α-methoxy-21-chloromethyl-Δ$^{4,6}$-pregnadiene-11β,17α,21-triol-3,20-dione
9α-ethoxy-21-chloromethyl-Δ$^{4,6}$-pregnadiene-11β,17α,21-triol-3,20-dione
21-chloromethyl-Δ$^{4,6}$-pregnadiene-17α,21-diol-3,11,20-trione
9α-fluoro-21-chloromethyl-Δ$^{4,6}$-pregnadiene-17α,21-diol-3,11,20-trione
9α-chloro-21-chloromethyl-Δ$^{4,6}$-pregnadiene-17α,21-diol-3,11,20-trione
9α-bromo-21-chloromethyl-Δ$^{4,6}$-pregnadiene-17α,21-diol-3,11,20-trione
9α-iodo-21-chloromethyl-Δ$^{4,6}$-pregnadiene-17α,21-diol-3,11,20-trione
9α-methoxy-21-chloromethyl-Δ$^{4,6}$-pregnadiene-17α,21-diol-3,11,20-trione
9α-ethoxy-21-chloromethyl-Δ$^{4,6}$-pregnadiene-17α,21-diol-3,11,20-trione
2α-methyl-21-chloromethyl-Δ$^{4,6}$-pregnadiene-11β,17α,21-triol-3,20-dione
9α-fluoro-2α-methyl-21-chloromethyl-Δ$^{4,6}$-pregnadiene-11β,17α,21-triol-3,20-dione
9α-chloro-2α-methyl-21-chloromethyl-Δ$^{4,6}$-pregnadiene-11β,17α,21-triol-3,20-dione
9α-bromo-2α-methyl-21-chloromethyl-Δ$^{4,6}$-pregnadiene-11β,17α,21-triol-3,20-dione
9α-iodo-2α-methyl-21-chloromethyl-Δ$^{4,6}$-pregnadiene-11β,17α,21-triol-3,20-dione
9α-methoxy-2α-methyl-21-chloromethyl-Δ$^{4,6}$-pregnadiene-11β,17α,21-triol-3,20-dione
9α-ethoxy-2α-methyl-21-chloromethyl-Δ$^{4,6}$-pregnadiene-11β,17α,21-triol-3,20-dione
2α-methyl-21-chloromethyl-Δ$^{4,6}$-pregnadiene-17α,21-diol-3,11,20-trione
9α-fluoro-2α-methyl-21-chloromethyl-Δ$^{4,6}$-pregnadiene-17α,21-diol-3,11,20-trione
9α-chloro-2α-methyl-21-chloromethyl-Δ$^{4,6}$-pregnadiene-17α,21-diol-3,11,20-trione
9α-bromo-2α-methyl-21-chloromethyl-Δ$^{4,6}$-pregnadiene-17α,21-diol-3,11,20-trione
9α-iodo-2α-methyl-21-chloromethyl-Δ$^{4,6}$-pregnadiene-17α,21-diol-3,11,20-trione
9α-methoxy-2α-methyl-21-chloromethyl-Δ$^{4,6}$-pregnadiene-17α,21-diol-3,11,20-trione
9α-ethoxy-2α-methyl-21-chloromethyl-Δ$^{4,6}$-pregnadiene-17α,21-diol-3,11,20-trione
6-methyl-21-chloromethyl-Δ$^{4,6}$-pregnadiene-11β,17α,21-triol-3,20-dione
9α-fluoro-6-methyl-21-chloromethyl-Δ$^{4,6}$-pregnadiene-11β,17α,21-triol-3,20-dione
9α-chloro-6-methyl-21-chloromethyl-Δ$^{4,6}$-pregnadiene-11β,17α,21-triol-3,20-dione
9α-iodo-6-methyl-21-chloromethyl-Δ$^{4,6}$-pregnadiene-11β,17α,21-triol-3,20-dione
9α-bromo-6-methyl-21-chloromethyl-Δ$^{4,6}$-pregnadiene-11β,17α,21-triol-3,20-dione
9α-methoxy-6-methyl-21-chloromethyl-Δ$^{4,6}$-pregnadiene-11β,17α,21-triol-3,20-dione
9α-ethoxy-6-methyl-21-chloromethyl-Δ$^{4,6}$-pregnadiene-11β,17α,21-triol-3,20-dione
6-methyl-21-chloromethyl-Δ$^{4,6}$-pregnadiene-17α,21-diol-3,11,20-trione
9α-fluoro-6-methyl-21-chloromethyl-Δ$^{4,6}$-pregnadiene-17α,21-diol-3,11,20-trione
9α-chloro-6-methyl-21-chloromethyl-Δ$^{4,6}$-pregnadiene-17α,21-diol-3,11,20-trione
9α-bromo-6-methyl-21-chloromethyl-Δ$^{4,6}$-pregadiene-17α,21-diol-3,11,20-trione
9α-iodo-6-methyl-21-chloromethyl-Δ$^{4,6}$-pregnadiene-17α,21-diol-3,11,20-trione
9α-methoxy-6-methyl-21-chloromethyl-Δ$^{4,6}$-pregnadiene-17α,21-diol-3,11,20-trione
9α-ethoxy-6-methyl-21-chloromethyl-Δ$^{4,6}$-pregnadiene-17α,21-diol-3,11,20-trione
21-chloromethyl-Δ$^{4,6}$-pregnadiene-11β,14α,17α,21-tetrol-3,20-dione
9α-fluoro-21-chloromethyl-Δ$^{4,6}$-pregnadiene-11β,14α,17α,21-tetrol-3,20-dione
9α-chloro-21-chloromethyl-Δ$^{4,6}$-pregnadiene-11β,14α,17α,21-tetrol-3,20-dione
9α-bromo-21-chloromethyl-Δ$^{4,6}$-pregnadiene-11β,14α,17α,21-tetrol-3,20-dione
9α-iodo-21-chloromethyl-Δ$^{4,6}$-pregnadiene-11β,14α,17α,21-tetrol-3,20-dione
9α-methoxy-21-chloromethyl-Δ$^{4,6}$-pregnadiene-11β,14α,17α,21-tetrol-3,20-dione
9α-ethoxy-21-chloromethyl-Δ$^{4,6}$-pregnadiene-11β,14α,17α,21-tetrol-3,20-dione
21-chloromethyl-Δ$^{4,6}$-pregnadiene-14α,17α,21-triol-3,11,20-trione
9α-fluoro-21-chloromethyl-Δ$^{4,6}$-pregnadiene-14α,17α,21-triol-3,11,20-trione
9α-chloro-21-chloromethyl-Δ$^{4,6}$-pregnadiene-14α,17α,21-triol-3,11,20-trione
9α-bromo-21-chloromethyl-Δ$^{4,6}$-pregnadiene-14α,17α,21-triol-3,11,20-trione
9α-iodo-21-chloromethyl-Δ$^{4,6}$-pregnadiene-14α,17α,21-triol-3,11,20-trione
9α-methoxy-21-chloromethyl-Δ$^{4,6}$-pregnadiene-14α,17α,21-triol-3,11,20-trione
9α-ethoxy-21-chloromethyl-Δ$^{4,6}$-pregnadiene-14α,17α,21-triol-3,11,20-trione
21-chloromethyl-Δ$^{4,6}$-pregnadiene-11β,16α,17α,21-tetrol-3,20-dione
9α-fluoro-21-chloromethyl-Δ$^{4,6}$-pregnadiene-11β,16α,17α,21-tetrol-3,20-dione
9α-chloro-21-chloromethyl-Δ$^{4,6}$-pregnadiene-11β,16α,17α,21-tetrol-3,20-dione
9α-bromo-21-chloromethyl-Δ$^{4,6}$-pregnadiene-11β,16α,17α,21-tetrol-3,20-dione
9α-iodo-21-chloromethyl-Δ$^{4,6}$-pregnadiene-11β,16α,17α,21-tetrol-3,20-dione
9α-methoxy-21-chloromethyl-Δ$^{4,6}$-pregnadiene-11β,16α,17α,21-tetrol-3,20-dione
9α-ethoxy-21-chloromethyl-Δ$^{4,6}$-pregnadiene-11β,16α,17α,21-tetrol-3,20-dione 21-chloromethyl-Δ⁴,⁶-pregnadiene-16α,17α,21-triol-3,11,20-trione
9α-fluoro-21-chloromethyl-Δ⁴,⁶-pregnadiene-16α,17α,21-triol-3,11,20-trione
9α-chloro-21-chloromethyl-Δ⁴,⁶-pregnadiene-16α,17α,21-triol-3,11,20-trione
9α-bromo-21-chloromethyl-Δ⁴,⁶-pregnadiene-16α,17α,21-triol-3,11,20-trione
9α-iodo-21-chloromethyl-Δ⁴,⁶-pregnadiene-16α,17α,21-triol-3,11,20-trione
9α-methoxy-21-chloromethyl-Δ⁴,⁶-pregnadiene-16α,17α,21-triol-3,11,20-trione
9α-ethoxy-21-chloromethyl-Δ⁴,⁶-pregnadiene-16α,17α,21-triol-3,11,20-trione 21-chloromethyl-Δ¹,⁴,⁶-pregnatriene-11β,17α,21-triol-3,20-dione
9α-fluoro-21-chloromethyl-Δ¹,⁴,⁶-pregnatriene-11β,17α,21-triol-3,20-dione
9α-chloro-21-chloromethyl-Δ¹,⁴,⁶-pregnatriene-11β,17α,21-triol-3,20-dione
9α-bromo-21-chloromethyl-Δ¹,⁴,⁶-pregnatriene-11β,17α,21-triol-3,20-dione
9α-iodo-21-chloromethyl-Δ¹,⁴,⁶-pregnatriene-11β,17α,21-triol-3,20-dione
9α-methoxy-21-chloromethyl-Δ¹,⁴,⁶-pregnatriene-11β,17α,21-triol-3,20-dione
9α-ethoxy-21-chloromethyl-Δ¹,⁴,⁶-pregnatriene-11β,17α,21-triol-3,20-dione 21-chloromethyl-Δ¹,⁴,⁶-pregnatriene-17α,21-diol-3,11,20-trione
9α-fluoro-21-chloromethyl-Δ¹,⁴,⁶-pregnatriene-17α,21-diol-3,11,20-trione
9α-chloro-21-chloromethyl-Δ¹,⁴,⁶-pregnatriene-17α,21-diol-3,11,20-trione
9α-bromo-21-chloromethyl-Δ¹,⁴,⁶-pregnatriene-17α,21-diol-3,11,20-trione
9α-iodo-21-chloromethyl-Δ¹,⁴,⁶-pregnatriene-17α,21-diol-3,11,20-trione
9α-methoxy-21-chloromethyl-Δ¹,⁴,⁶-pregnatriene-17α,21-diol-3,11,20-trione
9α-ethoxy-21-chloromethyl-Δ¹,⁴,⁶-pregnatriene-17α,21-diol-3,11,20-trione 2-methyl-21-chloromethyl-Δ¹,⁴,⁶-pregnatriene-11β,17α,21-triol-3,20-dione
9α-fluoro-2-methyl-21-chloromethyl-Δ¹,⁴,⁶-pregnatriene-11β,17α,21-triol-3,20-dione
9α-chloro-2-methyl-21-chloromethyl-Δ¹,⁴,⁶-pregnatriene-11β,17α,21-triol-3,20-dione
9α-bromo-2-methyl-21-chloromethyl-Δ¹,⁴,⁶-pregnatriene-11β,17α,21-triol-3,20-dione
9α-iodo-2-methyl-21-chloromethyl-Δ¹,⁴,⁶-pregnatriene-11β,17α,21-triol-3,20-dione
9α-methoxy-2-methyl-21-chloromethyl-Δ¹,⁴,⁶-pregnatriene-11β,17α,21-triol-3,20-dione
9α-ethoxy-2-methyl-21-chloromethyl-Δ¹,⁴,⁶-pregnatriene-11β,17α,21-triol-3,20-dione 2-methyl-21-chloromethyl-Δ¹,⁴,⁶-pregnatriene-17α,21-triol-3,11,20-trione
9α-fluoro-2-methyl-21-chloromethyl-Δ¹,⁴,⁶-pregnatriene-17α,21-triol-3,11,20-trione
9α-chloro-2-methyl-21-chloromethyl-Δ¹,⁴,⁶-pregnatriene-17α,21-triol-3,11,20-trione
9α-bromo-2-methyl-21-chloromethyl-Δ¹,⁴,⁶-pregnatriene-17α,21-triol-3,11,20-trione
9α-iodo-2-methyl-21-clhoromethyl-Δ¹,⁴,⁶-prgnatriene-17α,21-triol-3,11,20-trione
9α-methoxy-2-methyl-21-chloromethyl-Δ¹,⁴,⁶-pregnatriene-17α,21-triol-3,11,20-trione
9α-ethoxy-2-methyl-21-chloromethyl-Δ¹,⁴,⁶-pregnatriene-17α,21-triol-3,11,20-trione 6-methyl-21-chloromethyl-Δ¹,⁴,⁶-pregnatriene-11β,17α,21-triol-3,20-dione
9α-fluoro-6-methyl-21-chloromethyl-Δ¹,⁴,⁶-pregnatriene-11β,17α,21-triol-3,20-dione
9α-chloro-6-methyl-21-chloromethyl-Δ¹,⁴,⁶-pregnatriene-11β,17α,21-triol-3,20-dione
9α-bromo-6-methyl-21-chloromethyl-Δ¹,⁴,⁶-pregnatriene-11β,17α,21-triol-3,20-dione
9α-iodo-6-methyl-21-chloromethyl-Δ¹,⁴,⁶-pregnatriene-11β,17α,21-triol-3,20-dione
9α-methoxy-6-methyl-21-chloromethyl-Δ¹,⁴,⁶-pregnatriene-11β,17α,21-triol-3,20-dione
9α-ethoxy-6-methyl-21-chloromethyl-Δ¹,⁴,⁶-pregnatriene-11β,17α,21-triol-3,20-dione 6-methyl-21-chloromethyl-Δ¹,⁴,⁶-pregnatriene-17α,21-diol-3,11,20-trione
9α-fluoro-6-methyl-21-chloromethyl-Δ¹,⁴,⁶-pregnatriene-17α,21-diol-3,11,20-trione
9α-chloro-6-methyl-21-chloromethyl-Δ¹,⁴,⁶-pregnatriene-17α,21-diol-3,11,20-trione
9α-bromo-6-methyl-21-chloromethyl-Δ¹,⁴,⁶-pregnatriene-17α,21-diol-3,11,20-trione
9α-iodo-6-methyl-21-chloromethyl-Δ¹,⁴,⁶-pregnatriene-17α,21-diol-3,11,20-trione
9α-methoxy-6-methyl-21-chloromethyl-Δ¹,⁴,⁶-pregnatriene-17α,21-diol-3,11,20-trione
9α-ethoxy-6-methyl-21-chloromethyl-Δ¹,⁴,⁶-pregnatriene-17α,21-diol-3,11,20-trione 21-chloromethyl-Δ¹,⁴,⁶-pregnatriene-11β,14α,17α,21-tetrol-3,20-dione
9α-fluoro-21-chloromethyl-Δ¹,⁴,⁶-pregnatriene-11β,14α,17α,21-tetrol-3,20-dione
9α-chloro-21-chloromethyl-Δ¹,⁴,⁶-pregnatriene-11β,14α,17α,21-tetrol-3,20-dione
9α-bromo-21-chloromethyl-Δ¹,⁴,⁶-pregnatriene-11β,14α,17α,21-tetrol-3,20-dione
9α-iodo-21-chloromethyl-Δ¹,⁴,⁶-pregnatriene-11β,14α,17α,21-tetrol-3,20-dione
9α-methoxy-21-chloromethyl-Δ¹,⁴,⁶-pregnatriene-11β,14α,17α,21-tetrol-3,20-dione
9α-ethoxy-21-chloromethyl-Δ¹,⁴,⁶-pregnatriene-11β,14α,17α,21-tetrol-3,20-dione 21-chloromethyl-Δ¹,⁴,⁶-pregnatriene-14α,17α,21-triol-3,11,20-trione
9α-fluoro-21-chloromethyl-Δ¹,⁴,⁶-pregnatriene-14α,17α,21-triol-3,11,20-trione
9α-chloro-21-chloromethyl-Δ¹,⁴,⁶-pregnatriene-14α,17α,21-triol-3,11,20-trione
9α-bromo-21-chloromethyl-Δ¹,⁴,⁶-pregnatriene-14α,17α,21-triol-3,11,20-trione
9α-iodo-21-chloromethyl-Δ¹,⁴,⁶-pregnatriene-14α,17α,21-triol-3,11,20-trione
9α-methoxy-21-chloromethyl-Δ¹,⁴,⁶-pregnatriene-14α,17α,21-triol-3,11,20-trione
9α-ethoxy-21-chloromethyl-Δ¹,⁴,⁶-pregnatriene-14α,17α,21-triol-3,11,20-trione 21-chloromethyl-Δ¹,⁴,⁶-pregnatriene-11β,16α,17α,21-tetrol-3,20-dione
9α-fluoro-21-chloromethyl-Δ¹,⁴,⁶-pregnatriene-11β,16α,17α,21-tetrol-3,20-dione
9α-chloro-21-chloromethyl-Δ¹,⁴,⁶-pregnatriene-11β,16α,17α,21-tetrol-3,20-dione
9α-bromo-21-chloromethyl-Δ¹,⁴,⁶-pregnatriene-11β,16α,17α,21-tetrol-3,20-dione
9α-iodo-21-chloromethyl-Δ¹,⁴,⁶-pregnatriene-11β,16α,17α,21-tetrol-3,20-dione
9α-methoxy-21-chloromethyl-Δ¹,⁴,⁶-pregnatriene-11β,16α,17α,21-tetrol-3,20-dione
9α-ethoxy-21-chloromethyl-Δ¹,⁴,⁶-pregnatriene-11β,16α,17α,21-tetrol-3,20-dione 21-chloromethyl-Δ¹,⁴,⁶-pregnatriene-16α,17α,21-triol-3,11,20-trione
9α-fluoro-21-chloromethyl-Δ¹,⁴,⁶-pregnatriene-16α,17α,21-triol-3,11,20-trione 9α-chloro-21-chloromethyl-Δ$^{1,4,6}$-pregnatriene-16α,17α,21-triol-3,11,20-trione
9α-bromo-21-chloromethyl-Δ$^{1,4,6}$-pregnatriene-16α,17α,21-triol-3,11,20-trione
9α-iodo-21-chloromethyl-Δ$^{1,4,6}$-pregnatriene-16α,17α,21-triol-3,11,20-trione
9α-methoxy-21-chloromethyl-Δ$^{1,4,6}$-pregnatriene-16α,17α,21-triol-3,11,20-trione
9α-ethoxy-21-chloromethyl-Δ$^{1,4,6}$-pregnatriene-16α,17α,21-triol-3,11,20-trione 9α-fluoro-16-methylene-21-chloromethyl-Δ$^4$-pregnene-11β,17α,21-triol-3,20-dione
9α-chloro-16-methylene-21-chloromethyl-Δ$^4$-pregnene-11β,17α,21-triol-3,20-dione
9α-bromo-16-methylene-21-chloromethyl-Δ$^4$-pregnene-11β,17α,21-triol-3,20-dione
9α-iodo-16-methylene-21-chloromethyl-Δ$^4$-pregnene-11β,17α,21-triol-3,20-dione
9α-methoxy-16-methylene-21-chloromethyl-Δ$^4$-pregnene-11β,17α,21-triol-3,20-dione
9α-ethoxy-16-methylene-21-chloromethyl-Δ$^4$-pregnene-11β,17α,21-triol-3,20-dione 16-methylene-21-chloromethyl-Δ$^4$-pregnene-17α,21-diol-3,11,20-trione
9α-fluoro-16-methylene-21-chloromethyl-Δ$^4$-pregnene-17α,21-diol-3,11,20-trione
9α-chloro-16-methylene-21-chloromethyl-Δ$^4$-pregnene-17α,21-diol-3,11,20-trione
9α-bromo-16-methylene-21-chloromethyl-Δ$^4$-pregnene-17α,21-diol-3,11,20-trione
9α-iodo-16-methylene-21-chloromethyl-Δ$^4$-pregnene-17α,21-diol-3,11,20-trione
9α-methoxy-16-methylene-21-chloromethyl-Δ$^4$-pregnene-17α,21-diol-3,11,20-trione
9α-ethoxy-16-methylene-21-chloromethyl-Δ$^4$-pregnene-17α,21-diol-3,11,20-trione 16-methylene-21-chloromethyl-Δ$^{1,4}$-pregnadiene-11β,17α,21-triol-3,20-dione
9α-fluoro-16-methylene-21-chloromethyl-Δ$^{1,4}$-pregnadiene-11β,17α,21-triol-3,20-dione
9α-chloro-16-methylene-21-chloromethyl-Δ$^{1,4}$-pregnadiene-11β,17α,21-triol-3,20-dione
9α-bromo-16-methylene-21-chloromethyl-Δ$^{1,4}$-pregnadiene-11β,17α,21-triol-3,20-dione
9α-iodo-16-methylene-21-chloromethyl-Δ$^{1,4}$-pregnadiene-11β,17α,21-triol-3,20-dione
9α-methoxy-16-methylene-21-chloromethyl-Δ$^{1,4}$-pregnadiene-11β,17α,21-triol-3,20-dione
9α-ethoxy-16-methylene-21-chloromethyl-Δ$^{1,4}$-pregnadiene-11β,17α,21-triol-3,20-dione 16-methylene-21-chloromethyl-Δ$^{4,6}$-pregnadiene-17α,21-diol-3,11,20-trione
9α-fluoro-16-methylene-21-chloromethyl-Δ$^{4,6}$-pregnadiene-17α,21-diol-3,11,20-trione
9α-chloro-16-methylene-21-chloromethyl-Δ$^{4,6}$-pregnadiene-17α,21-diol-3,11,20-trione
9α-bromo-16-methylene-21-chloromethyl-Δ$^{4,6}$-pregnadiene-17α,21-diol-3,11,20-trione
9α-iodo-16-methylene-21-chloromethyl-Δ$^{4,6}$-pregnadiene-17α,21-diol-3,11,20-trione
9α-methoxy-16-methylene-21-chloromethyl-Δ$^{4,6}$-pregnadiene-17α,21-diol-3,11,20-trione
9α-ethoxy-16-methylene-21-chloromethyl-Δ$^{4,6}$-pregnadiene-17α,21-diol-3,11,20-trione 16-methylene-21-chloromethyl-Δ$^{4,6}$-pregnadiene-11β,17α,21-triol-3,20-dione
9α-fluoro-16-methylene-21-chloromethyl-Δ$^{4,6}$-pregnadiene-11β,17α,21-triol-3,20-dione
9α-chloro-16-methylene-21-chloromethyl-Δ$^{4,6}$-pregnadiene-11β,17α,21-triol-3,20-dione
9α-bromo-16-methylene-21-chloromethyl-Δ$^{4,6}$-pregnadiene-11β,17α,21-triol-3,20-dione
9α-iodo-16-methylene-21-chloromethyl-Δ$^{4,6}$-pregnadiene-11β,17α,21-triol-3,20-dione
9α-methoxy-16-methylene-21-chloromethyl-Δ$^{4,6}$-pregnadiene-11β,17α,21-triol-3,20-dione
9α-ethoxy-16-methylene-21-chloromethyl-Δ$^{4,6}$-pregnadiene-11β,17α,21-triol-3,20-dione 16-methylene-21-chloromethyl-Δ$^{1,4}$-pregnadiene-17α,21-diol-3,11,20-trione
9α-fluoro-16-methylene-21-chloromethyl-Δ$^{1,4}$-pregnadiene-17α,21-diol-3,11,20-trione
9α-chloro-16-methylene-21-chloromethyl-Δ$^{1,4}$-pregnadiene-17α,21-diol-3,11,20-trione
9α-bromo-16-methylene-21-chloromethyl-Δ$^{1,4}$-pregnadiene-17α,21-diol-3,11,20-trione
9α-iodo-16-methylene-21-chloromethyl-Δ$^{1,4}$-pregnadiene-17α,21-diol-3,11,20-trione
9α-methoxy-16-methylene-21-chloromethyl-Δ$^{1,4}$-pregnadiene-17α,21-diol-3,11,20-trione
9α-ethoxy-16-methylene-21-chloromethyl-Δ$^{1,4}$-pregnadiene-17α,21-diol-3,11,20-trione 16-methylene-21-chloromethyl-Δ$^{1,4,6}$-pregnatriene-11β,17α,21-triol-3,20-dione
9α-fluoro-16-methylene-21-chloromethyl-Δ$^{1,4,6}$-pregnatriene-11β,17α,21-triol-3,20-dione
9α-chloro-16-methylene-21-chloromethyl-Δ$^{1,4,6}$-pregnatriene-11β,17α,21-triol-3,20-dione
9α-bromo-16-methylene-21-chloromethyl-Δ$^{1,4,6}$-pregnatriene-11β,17α,21-triol-3,20-dione
9α-iodo-16-methylene-21-chloromethyl-Δ$^{1,4,6}$-pregnatriene-11β,17α,21-triol-3,20-dione
9α-methoxy-16-methylene-21-chloromethyl-Δ$^{1,4,6}$-pregnatriene-11β,17α,21-triol-3,20-dione
9α-ethoxy-16-methylene-21-chloromethyl-Δ$^{1,4,6}$-pregnatriene-11β,17α,21-triol-3,20-dione 16-methylene-21-chloromethyl-Δ$^{1,4,6}$-pregnatriene-17α,21-diol-3,11,20-trione
9α-fluoro-16-methylene-21-chloromethyl-Δ$^{1,4,6}$-pregnatriene-17α,21-diol-3,11,20-trione
9α-chloro-16-methylene-21-chloromethyl-Δ$^{1,4,6}$-pregnatriene-17α,21-diol-3,11,20-trione
9α-bromo-16-methylene-21-chloromethyl-Δ$^{1,4,6}$-pregnatriene-17α,21-diol-3,11,20-trione
9α-iodo-16-methylene-21-chloromethyl-Δ$^{1,4,6}$-pregnatriene-17α,21-diol-3,11,20-trione
9α-methoxy-16-methylene-21-chloromethyl-Δ$^{1,4,6}$-pregnatriene-17α,21-diol-3,11,20-trione
9α-ethoxy-16-methylene-21-chloromethyl-Δ$^{1,4,6}$-pregnatriene-17α,21-diol-3,11,20-trione 9α,16α-difluoro-21-chloromethyl-Δ$^4$-pregnene-11β,17α,21-triol-3,20-dione
9α-chloro-16α-fluoro-21-chloromethyl-Δ$^4$-pregnene-11β,17α,21-triol-3,20-dione
9α-bromo-16α-fluoro-21-chloromethyl-Δ$^4$-pregnene-11β,17α,21-triol-3,20-dione
9α-iodo-16α-fluoro-21-chloromethyl-Δ$^4$-pregnene-11β,17α,21-triol-3,20-dione
9α-methoxy-16α-fluoro-21-chloromethyl-Δ$^4$-pregnene-11β,17α,21-triol-3,20-dione
9α-ethoxy-16α-fluoro-21-chloromethyl-Δ$^4$-pregnene-11β,17α,21-triol-3,20-dione 16α-fluoro-21-chloromethyl-Δ$^4$-pregnene-17α,21-diol-3,11,20-trione
9α,16α-difluoro-21-chloromethyl-Δ$^4$-pregnene-17α,21-diol-3,11,20-trione
9α-chloro-16α-fluoro-21-chloromethyl-Δ$^4$-pregnene-17α,21-diol-3,11,20-trione
9α-bromo-16α-fluoro-21-chloromethyl-Δ$^4$-pregnene-17α,21-diol-3,11,20-trione
9α-iodo-16α-fluoro-21-chloromethyl-Δ$^4$-pregnene-17α,21-diol-3,11,20-trione
9α-methoxy-16α-fluoro-21-chloromethyl-Δ$^4$-pregnene-17α,21-diol-3,11,20-trione 9α-ethoxy-16α-fluoro-21-chloromethyl-Δ⁴-pregnene-17α, 21-diol-3,11,20-trione 16α-fluoro-21-chloromethyl-Δ¹,⁴-pregnadiene-11β,17α,21-triol-3,20-dione
9α,16α-difluoro-21-chloromethyl-Δ¹,⁴-pregnadiene-11β,17α, 21-triol-3,20-dione
9α-chloro-16α-fluoro-21-chloromethyl-Δ¹,⁴-pregnadiene-11β,17α,21-triol-3,20-dione
9α-bromo-16α-fluoro-21-chloromethyl-Δ¹,⁴-pregnadiene-11β,17α,21-triol-3,20-dione
9α-iodo-16α-fluoro-21-chloromethyl-Δ¹,⁴-pregnadiene-11β,17α,21-triol-3,20-dione
9α-methoxy-16α-fluoro-21-chloromethyl-Δ¹,⁴-pregnadiene-11β,17α,21-triol-3,20-dione
9α-ethoxy-16α-fluoro-21-chloromethyl-Δ¹,⁴-pregnadiene-11β,17α,21-triol-3,20-dione 16α-fluoro-21-chloromethyl-Δ⁴,⁶-pregnadiene-17α,21-diol-3,11,20-trione
9α,16α-difluoro-21-chloromethyl-Δ⁴,⁶-pregnadiene-17α,21-diol-3,11,20-trione
9α-chloro-16α-fluoro-21-chloromethyl-Δ⁴,⁶-pregnadiene-17α,21-diol-3,11,20-trione
9α-bromo-16α-fluoro-21-chloromethyl-Δ⁴,⁶-pregnadiene-17α,21-diol-3,11,20-trione
9α-iodo-16α-fluoro-21-chloromethyl-Δ⁴,⁶-pregnadiene-17α,21-diol-3,11,20-trione
9α-methoxy-16α-fluoro-21-chloromethyl-Δ⁴,⁶-pregnadiene-17α,21-diol-3,11,20-trione
9α-ethoxy-16α-fluoro-21-chloromethyl-Δ⁴,⁶-pregnadiene-17α,21-diol-3,11,20-trione 16α-fluoro-21-chloromethyl-Δ⁴,⁶-pregnadiene-11β,17α,21-triol-3,20-dione
9α,16α-difluoro-21-chloromethyl-Δ⁴,⁶-pregnadiene-11β,17α,21-triol-3,20-dione
9α-chloro-16α-fluoro-21-chloromethyl-Δ⁴,⁶-pregnadiene-11β-17α,21-triol-3,20-dione
9α-bromo-16α-fluoro-21-chloromethyl-Δ⁴,⁶-pregnadiene-11β,17α,21-triol-3,20-dione
9α-iodo-16α-fluoro-21-chloromethyl-Δ⁴,⁶-pregnadiene-11β,17α,21-triol-3,20-dione
9α-methoxy-16α-fluoro-21-chloromethyl-Δ⁴,⁶-pregnadiene-11β,17α,21-triol-3,20-dione
9α-ethoxy-16α-fluoro-21-chloromethyl-Δ⁴,⁶-pregnadiene-11β,17α,21-triol-3,20-dione 16α-fluoro-21-chloromethyl-Δ¹,⁴-pregnadiene-17α,21-diol-3,11,20-trione
9α,16α-difluoro-21-chloromethyl-Δ¹,⁴-pregnadiene-17α,21-diol-3,11,20-trione
9α-chloro-16α-fluoro-21-chloromethyl-Δ¹,⁴-pregnadiene-17α,21-diol-3,11,20-trione
9α-bromo-16α-fluoro-21-chloromethyl-Δ¹,⁴-pregnadiene-17α,21-diol-3,11,20-trione
9α-iodo-16α-fluoro-21-chloromethyl-Δ¹,⁴-pregnadiene-17α,21-diol-3,11,20-trione
9α-methoxy-16α-fluoro-21-chloromethyl-Δ¹,⁴-pregnadiene-17α,21-diol-3,11,20-trione
9α-ethoxy-16α-fluoro-21-chloromethyl-Δ¹,⁴-pregnadiene-17α,21-diol-3,11,20-trione 16α-fluoro-21-chloromethyl-Δ¹,⁴,⁶-pregnatriene-11β,17α,21-triol-3,20-dione
9α,16α-difluoro-21-chloromethyl-Δ¹,⁴,⁶-pregnatriene-11β,17α,21-triol-3,20-dione
9α-chloro-16α-fluoro-21-chloromethyl-Δ¹,⁴,⁶-pregnatriene-11β,17α,21-triol-3,20-dione
9α-bromo-16α-fluoro-21-chloromethyl-Δ¹,⁴,⁶-pregnatriene-11β,17α,21-triol-3,20-dione
9α-iodo-16α-fluoro-21-chloromethyl-Δ¹,⁴,⁶-pregnatriene-11β,17α,21-triol-3,20-dione
9α-methoxy-16α-fluoro-21-chloromethyl-Δ¹,⁴,⁶-pregnatriene-11β,17α,21-triol-3,20-dione
9α-ethoxy-16α-fluoro-21-chloromethyl-Δ¹,⁴,⁶-pregnatriene-11β,17α,21-triol-3,20-dione 16α-fluoro-21-chloromethyl-Δ¹,⁴,⁶-pregnatriene-17α,21-diol-3,11,20-trione
9α,16α-difluoro-21-chloromethyl-Δ¹,⁴,⁶-pregnatriene-17α,21-diol-3,11,20-trione
9α-chloro-16α-fluoro-21-chloromethyl-Δ¹,⁴,⁶-pregnatriene-17α,21-diol-3,11,20-trione
9α-bromo-16α-fluoro-21-chloromethyl-Δ¹,⁴,⁶-pregnatriene-17α,21-diol-3,11,20-trione
9α-iodo-16α-fluoro-21-chloromethyl-Δ¹,⁴,⁶-pregnatriene-17α,21-diol-3,11,20-trione
9α-methoxy-16α-fluoro-21-chloromethyl-Δ¹,⁴,⁶-pregnatriene-17α,21-diol-3,11,20-trione
9α-ethoxy-16α-fluoro-21-chloromethyl-Δ¹,⁴,⁶-pregnatriene-17α,21-diol-3,11,20-trione 6α,9α-difluoro-21-chloromethyl-Δ⁴-pregnene-11β,17α,21-triol-13,20-dione
9α-chloro-6α-fluoro-21-chloromethyl-Δ⁴-pregnene-11β,17α,21-triol-3,20-dione
9α-bromo-6α-fluoro-21-chloromethyl-Δ⁴-pregnene-11β,17α,21-triol-3,20-dione
9α-iodo-6α-fluoro-21-chloromethyl-Δ⁴-pregnene-11β,17α,21-triol-3,20-dione
9α-methoxy-6α-fluoro-21-chloromethyl-Δ⁴-pregnene-11β,17α,21-triol-3,20-dione
9α-ethoxy-6α-fluoro-21-chloromethyl-Δ⁴-pregnene-11β,17α,21-triol-3,20-dione 6α-fluoro-21-chloromethyl-Δ⁴-pregnene-17α,21-diol-3,11,20-trione
6α,9α-difluoro-21-chloromethyl-Δ⁴-pregnene-17α,21-diol-3,11,20-trione
9α-chloro-6α-fluoro-21-chloromethyl-Δ⁴-pregnene-17α,21-diol-3,11,20-trione
9α-bromo-6α-fluoro-21-chloromethyl-Δ⁴-pregnene-17α,21-diol-3,11,20-trione
9α-iodo-6α-fluoro-21-chloromethyl-Δ⁴-pregnene-17α,21-diol-3,11,20-trione
9α-methoxy-6α-fluoro-21-chloromethyl-Δ⁴-pregnene-17α,21-diol-3,11,20-trione
9α-ethoxy-6α-fluoro-21-chloromethyl-Δ⁴-pregnene-17α,21-diol-3,11,20-trione 6α-fluoro-21-chloromethyl-Δ¹,⁴-pregnadiene-11β,17α,21-triol-3,20-dione
6α,9α-difluoro-21-chloromethyl-Δ¹,⁴-pregnadiene-11β,17α-triol-3,20-dione
9α-chloro-6α-fluoro-21-chloromethyl-Δ¹,⁴-pregnadiene-11β,17α,21-triol-3,20-dione
9α-bromo-6α-fluoro-21-chloromethyl-Δ¹,⁴-pregnadiene-11β,17α,21-triol-3,20-dione
9α-iodo-6α-fluoro-21-chloromethyl-Δ¹,⁴-pregnadiene-11β,17α,21-triol-3,20-dione
9α-methoxy-6α-fluoro-21-chloromethyl-Δ¹,⁴-pregnadiene-11β,17α,21-triol-3,20-dione
9α-ethoxy-6α-fluoro-21-chloromethyl-Δ¹,⁴-pregnadiene-11β,17α,21-triol-3,20-dione 6α-fluoro-21-chloromethyl-Δ¹,⁴-pregnadiene-17α,21-diol-3,11,20-trione
6α,9α-difluoro-21-chloromethyl-Δ¹,⁴-pregnadiene-17α,21-diol-3,11,20-trione
9α-chloro-6α-fluoro-21-chloromethyl-Δ¹,⁴-pregnadiene-17α,21-diol-3,11,20-trione
9α-bromo-6α-fluoro-21-chloromethyl-Δ¹,⁴-pregnadiene-17α,21-diol-3,11,20-trione
9α-iodo-6α-fluoro-21-chloromethyl-Δ¹,⁴-pregnadiene-17α,21-diol-3,11,20-trione
9α-methoxy-6α-fluoro-21-chloromethyl-Δ¹,⁴-pregnadiene-17α,21-diol-3,11,20-trione
9α-ethoxy-6α-fluoro-21-chloromethyl-Δ¹,⁴-pregnadiene-17α,21-diol-3,11,20-trione 9α-fluoro-16α-methyl-21-chloromethyl-Δ⁴-pregnene-11β,17α,21-triol-3,20-dione
9α-chloro-16α-methyl-21-chloromethyl-Δ⁴-pregnene-11β,17α,21-triol-3,20-dione 9α-bromo-16α-methyl-21-chloromethyl-Δ⁴-pregnene-11β,
  17α,21-triol-3,20-dione
9α-iodo-16α-methyl-21-chloromethyl-Δ⁴-pregnene-11β,
  17α,21-triol-3,20-dione
9α-methoxy-16α-methyl-21-chloromethyl-Δ⁴-pregnene-
  11β,17α,21-triol-3,20-dione
9α-ethoxy-16α-methyl-21-chloromethyl-Δ⁴-pregnene-11β,
  17α,21-triol-3,20-dione 16α-methyl-21-chloromethyl-Δ⁴-pregnene-17α,21-diol-
  3,11,20-trione
9α-fluoro-16α-methyl-21-chloromethyl-Δ⁴-pregnene-17α,
  21-diol-3,11,20-trione
9α-chloro-16α-methyl-21-chloromethyl-Δ⁴-pregnene-17α,
  21-diol-3,11,20-trione
9α-bromo-16α-methyl-21-chloromethyl-Δ⁴-pregnene-17α,
  21-diol-3,11,20-trione
9α-iodo-16α-methyl-21-chloromethyl-Δ⁴-pregnene-17α,
  21-diol-3,11,20-trione
9α-methoxy-16α-methyl-21-chloromethyl-Δ⁴-pregnene-
  17α,21-diol-3,11,20-trione
9α-ethoxy-16α-methyl-21-chloromethyl-Δ⁴-pregnene-17α,
  21-diol-3,11,20-trione 16α-methyl-21-chloromethyl-Δ¹,⁴-pregnadiene-11β,17α,21-
  triol-3,20-dione
9α-fluoro-16α-methyl-21-chloromethyl-Δ¹,⁴-pregnadiene-
  11β,17α,21-triol-3,11,20-dione
9α-chloro-16α-methyl-21-chloromethyl-Δ¹,⁴-pregnadiene-
  11β,17α,21-triol-3,20-dione
9α-bromo-16α-methyl-21-chloromethyl-Δ¹,⁴-pregnadiene-
  11β,17α,21-triol-3,20-dione
9α,iodo-16α-methyl-21-chloromethyl-Δ¹,⁴-pregnadiene-
  11β,17α,21-triol-3,20-dione
9α-methoxy-16α-methyl-21-chloromethyl-Δ¹,⁴-pregnadi-
  ene-11β,17α,21-triol-3,20-dione
9α-ethoxy-16α-methyl-21-chloromethyl-Δ¹,⁴-pregnadiene-
  11β,17α,21-triol-3,20-dione 16α-methyl-21-chloromethyl-Δ⁴,⁶-pregnadiene-17α,21-
  diol-3,11,20-trione
9α-fluoro-16α-methyl-21-chloromethyl-Δ⁴,⁶-pregnadiene-
  17α,21-diol-3,11,20-trione
9α-chloro-16α-methyl-21-chloromethyl-Δ⁴,⁶-pregnadiene-
  17α,21-diol-3,11,20-trione
9α-bromo-16α-methyl-21-chloromethyl-Δ⁴,⁶-pregnadiene-
  17α,21-diol-3,11,20-trione
9α-iodo-16α-methyl-21-chloromethyl-Δ⁴,⁶-pregnadiene-
  17α,21-diol-3,11,20-trione
9α-methoxy-16α-methyl-21-chloromethyl-Δ⁴,⁶-pregnadi-
  ene-17α,21-diol-3,11,20-trione
9α-ethoxy-16α-methyl-21-chloromethyl-Δ⁴,⁶-pregnadiene-
  17α,21-diol-3,11,20-trione 16α-methyl-21-chloromethyl-Δ⁴,⁶-pregnadiene-11β,17α,21-
  triol-3,20-dione
9α-fluoro-16α-methyl-21-chloromethyl-Δ⁴,⁶-pregnadiene-
  11β,17α,21-triol-3,20-dione
9α-chloro-16α-methyl-21-chloromethyl-Δ⁴,⁶-pregnadiene-
  11β,17α,21-triol-3,20-dione
9α-bromo-16α-methyl-21-chloromethyl-Δ⁴,⁶-pregnadiene-
  11β,17α,21-triol-3,20-dione
9α-iodo-16α-methyl-21-chloromethyl-Δ⁴,⁶-pregnadiene-
  11β,17α,21-triol-3,20-dione
9α-methoxy-16α-methyl-21-chloromethyl-Δ⁴,⁶-
  pregnadiene-11β,17α,21-triol-3,20-dione
9α-ethoxy-16α-methyl-21-chloromethyl-Δ⁴,⁶-pregnadiene-
  11β,17α,21-triol-3,20-dione 16α-methyl-21-chloromethyl-Δ¹,⁴-pregnadiene-
  17α,21-diol-3,11,20-trione
9α-fluoro-16α-methyl-21-chloromethyl-Δ¹,⁴-pregnadiene-
  17α,21-diol-3,11,20-trione
9α-chloro-16α-methyl-21-chloromethyl-Δ¹,⁴-pregnadiene-
  17α,21-diol-3,11,20-trione
9α-bromo-16α-methyl-21-chloromethyl-Δ¹,⁴-pregnadiene-
  17α,21-diol-3,11,20-trione 9α-iodo-16α-methyl-21-chloromethyl-Δ¹,⁴-pregnadiene-
  17α,21-diol-3,11,20-trione
9α-methoxy-16α-methyl-21-chloromethyl-Δ¹,⁴-
  pregnadiene-17α,21-diol-3,11,20-trione
9α-ethoxy-16α-methyl-21-chloromethyl-Δ¹,⁴-pregnadiene-
  17α,21-diol-3,11,20-trione 16α-methyl-21-chloromethyl-Δ¹,⁴,⁶-pregnadiene-
  11β,17α,21-triol-3,20-dione
9α-fluoro-16α-methyl-21-chloromethyl-Δ¹,⁴,⁶-pregnatriene-
  11β,17α,21-triol-3,20-dione
9α-chloro-16α-methyl-21-chloromethyl-Δ¹,⁴,⁶-
  pregnatriene-11β,17α,21-triol-3,20-dione
9α-bromo-16α-methyl-21-chloromethyl-Δ¹,⁴,⁶-pregnatriene-
  11β,17α,21-triol-3,20-dione
9α-iodo-16α-methyl-21-chloromethyl-Δ¹,⁴,⁶-pregnatriene-
  11β,17α,21-triol-3,20-dione
9α-methoxy-16α-methyl-21-chloromethyl-Δ¹,⁴,⁶-
  pregnatriene-11β,17α,21-triol-3,20-dione
9α-ethoxy-16α-methyl-21-chloromethyl-Δ¹,⁴,⁶-
  pregnatriene-11β,17α,21-triol-3,20-dione 16α-methyl-21-chloromethyl-Δ¹,⁴,⁶-pregnatriene-
  17α,21-diol-3,11,20-trione
9α-fluoro-16α-methyl-21-chloromethyl-Δ¹,⁴,⁶-pregnatriene-
  17α,21-diol-3,11,20-trione
9α-chloro-16α-methyl-21-chloromethyl-Δ¹,⁴,⁶-pregnatriene-
  17α,21-diol-3,11,20-trione
9α-bromo-16α-methyl-21-chloromethyl-Δ¹,⁴,⁶-
  pregnatriene-17α,21-diol-3,11,20-trione
9α-iodo-16α-methyl-21-chloromethyl-Δ¹,⁴,⁶-pregnatriene-
  17α,21-diol-3,11,20-trione
9α-methoxy-16α-methyl-21-chloromethyl-Δ¹,⁴,⁶-
  pregnatriene-17α,21-diol-3,11,20-trione
9α-ethoxy-16α-methyl-21-chloromethyl-Δ¹,⁴,⁶-
  pregnatriene-17α,21-diol-3,11,20-trione 6α-chloro-21-chloromethyl-Δ⁴-pregnene-
  17α,21-diol-3,11,20-trione
6α-chloro-9α-fluoro-21-chloromethyl-Δ⁴-pregnene-
  17α,21-diol-3,11,20-trione
6α,9α-dichloro-21-chloromethyl-Δ⁴-pregnene-
  17α,21-diol-3,11,20-trione
6α-chloro-9α-bromo-21-chloromethyl-Δ⁴-pregnene-
  17α,21-diol-3,11,20-trione
6α-chloro-9α-iodo-21-chloromethyl-Δ⁴-pregnene-
  17α,21-diol-3,11,20-trione
6α-chloro-9α-methoxy-21-chloromethyl-Δ⁴-pregnene-
  17α,21-diol-3,11,20-trione
6α-chloro-9α-ethoxy-21-chloromethyl-Δ⁴-pregnene-
  17α,21-diol-3,11,20-trione A variety of esters of the foregoing 16- and 21-hydroxylated compounds as well as esters of the 21-hydroxymethyl compounds are prepared in accordance with standard esterification procedures. The esters prepared include the formates, acetates, propionates, propenoates, butyrates, decanoates, hemisuccinates, hemiglutarates, toluates, citrates and cyclohexylpropeionates. In those compounds having both a 16-hydroxyl and a 21-hydroxyl or 21-hydroxymethyl group, the esters prepared generally contain the same acyl group at both positions. There is no particular advantage in preparing diesters with diverse groups at the 16- and 21-positions, but if desired these can be prepared either by using 16-esterified steroid aldehyde as the starting compound or by careful hydrolysis and re-esterification using procedures well known in the art.

Alkali and alkaline earth metal salts of the acid esters are prepared by reaction of the said acid esters with the hydroxides or carbonates of the selected metal in accordance with standard procedures. These products have the advantage of increased solubility in water compared to the other compounds of this invention.

Compounds within the purview of this invention having an 11-keto group are prepared by oxidation of the 11β- hydroxyl group. It is preferred to use starting materials already containing an 11-keto group, since oxidation of an 11β-hydroxyl group in the final product may lead to a mixture as a result of simultaneous oxidation of hydroxyl groups in the side chain at the 17β-position. These oxidations are effected by procedures well known in the art, including, for example, the use of chromium trioxide or the chromic acid-pyridine complex.

The following example is illustrative of two of the methods used to prepare the 16,17-acetonides of this invention, including those prepared from the compounds of the previous examples. Those prepared by these methods include the acetals and ketals from acetaldehyde, propionaldehyde, butyraldehyde, acetone, di-isopropyl ketone, methyl ethyl ketone and di-n-butyl ketone.

9α - fluoro - 21 - chloromethyl - $\Delta^{1,4}$ - pregnadiene-11β,16α,17α,21-tetrol-3-20-dione (100 mg.) was taken up in 100 ml. of acetone which had been previously dried over anhydrous potassium carbonate. To this mixture, there was added 495 mg. of anhydrous copper sulfate and the mixture was stirred at 20°–30° C. for two days. The mixture was filtered, dried over anhydrous potassium carbonate, again filtered and the excess solvent removed in vacuo. The residue was triturated with ether containing a few drops of acetone and the desired product recovered by filtration.

9α - fluoro - 21 - chloro - 21 - hydroxymethyl - $\Delta^{1,4}$-pregnadiene-11β,16α,17α-triol-3,20-dione (350 mg.) was taken up in 25 ml. of propionaldehyde containing two drops of concentrated hydrochloric acid. The mixture was refluxed for 5 minutes and allowed to stand at 20°–30° C. for 8 hours. The desired product was precipitated by the addition of water and isolated by filtration.

What is claimed is:

1. A compound selected from the group consisting of those having the formulae

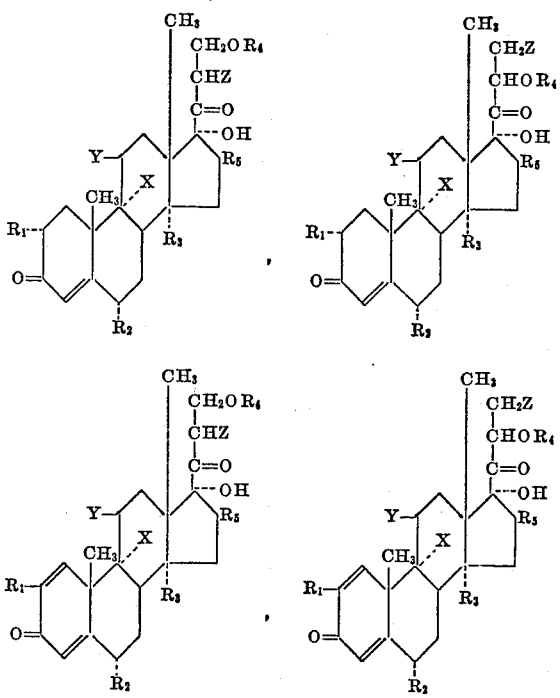

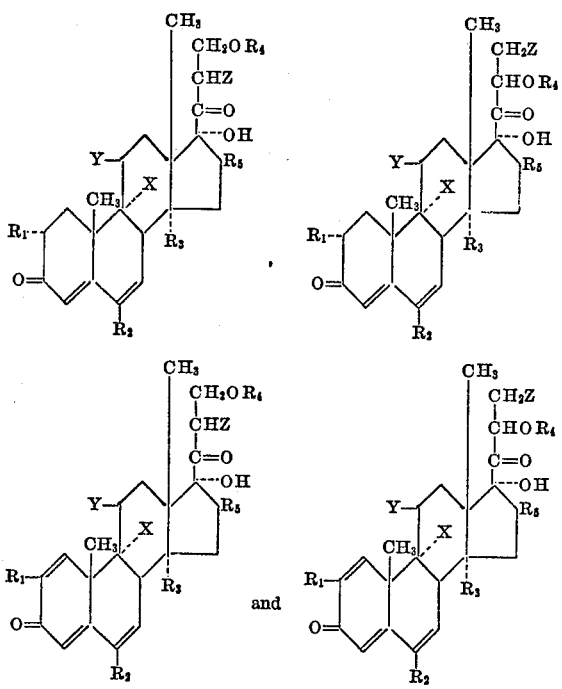

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_4$ is selected from the group consisting of hydrogen and acyl; $R_5$ is selected from the group consisting of

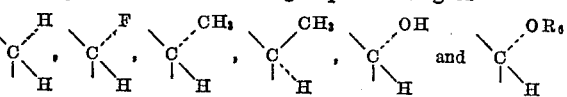

wherein $R_6$ is an acyl group; each of said acyl groups containing only carbon, hydrogen and oxygen and being derived from mono- and dicarboxylic acids containing up to ten carbon atoms; X is selected from the group consisting of hydrogen, α-halogen, α-methoxy and α-ethoxy; Y is selected from the group consisting of keto and β-hydroxyl; Z is selected from the group consisting of fluorine, chlorine, bromine and iodine; the carbon atom at the 16-position being always substituted with at least one hydrogen and at least three of $R_1$, $R_2$, $R_3$, and the second substituent on the number 16 carbon atom always being hydrogen; 16,17-acetonides of said 16,17-dihydroxylated compounds, the acetonide moiety containing from two to nine carbon atoms; and alkali metal and alkaline earth metal salts of said acylated compounds wherein the acyl groups are derived from dicarboxylic acids.

2. A pharmaceutical composition comprising a compound as claimed in claim 1 together with a pharmaceutically acceptable carrier.

3. A process for the preparation of a compound as claimed in claim 1 which comprises contacting the corresponding 17β(2,3-epoxido-propionyl)-substituted steroid with a halogen acid in a reaction inert organic solvent at a temperature of from about −15° to about 30° C. for a period from about 15 minutes to about 4 hours.

No references cited.